(12) United States Patent
Hawa et al.

(10) Patent No.: US 10,713,282 B2
(45) Date of Patent: *Jul. 14, 2020

(54) SYSTEMS AND METHODS FOR SEAMLESS ACCESS TO REMOTELY MANAGED DOCUMENTS USING SYNCHRONIZATION OF LOCALLY STORED DOCUMENTS

(71) Applicant: OPEN TEXT SA ULC, Halifax (CA)

(72) Inventors: Raja Elias Hawa, Ottawa (CA); Matthew David George Timmermans, Ottawa (CA)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,902

(22) Filed: Mar. 18, 2019

(65) Prior Publication Data

US 2019/0213204 A1 Jul. 11, 2019

Related U.S. Application Data

(63) Continuation of application No. 15/862,236, filed on Jan. 4, 2018, now Pat. No. 10,275,510, which is a (Continued)

(51) Int. Cl.
*G06F 17/00* (2019.01)
*G06F 16/27* (2019.01)
(Continued)

(52) U.S. Cl.
CPC .......... *G06F 16/275* (2019.01); *G06F 40/134* (2020.01); *G06F 40/166* (2020.01);
(Continued)

(58) Field of Classification Search
CPC ............... G06F 16/275; G06F 17/2235; G06F 17/2288; G06F 17/24; G06F 40/134;
(Continued)

(56) References Cited

U.S. PATENT DOCUMENTS 5,202,982 A 4/1993 Gramlich et al.
5,293,619 A 3/1994 Dean
(Continued)

OTHER PUBLICATIONS

Muthiacharoen et al., A Low-bandwidth Network File System, ACM 2001, pp. 174-187. (Year: 2001).*
(Continued)

*Primary Examiner* — Cong-Lac Huynh
(74) *Attorney, Agent, or Firm* — Sprinkle IP Law Group

(57) ABSTRACT

A system and method for seamless access to remotely manage documents using synchronization of locally stored documents are provided. In some embodiments, a content management server stores documents in a cache on the user's computer. Documents can thus be accessed and edited using the document in the local file system of the user and synchronized with the content management server asynchronously to access the documents on the local files system. Advantageously, the teachings of embodiments as described can be used in conjunction with content management systems for providing faster access to documents in conjunction with editing and for enabling offline work on such documents.

18 Claims, 13 Drawing Sheets

US 10,713,282 B2
Page 2

Related U.S. Application Data continuation of application No. 14/555,385, filed on Nov. 26, 2014, now Pat. No. 9,898,520.

(60) Provisional application No. 61/970,278, filed on Mar. 25, 2014, provisional application No. 61/970,270, filed on Mar. 25, 2014.

(51) Int. Cl.
   H04L 29/08 (2006.01)
   G06F 40/134 (2020.01)
   G06F 40/166 (2020.01)
   G06F 40/197 (2020.01)

(52) U.S. Cl.
   CPC ............ G06F 40/197 (2020.01); H04L 67/06 (2013.01); H04L 67/1085 (2013.01); H04L 67/1095 (2013.01); H04L 67/2842 (2013.01); H04L 67/02 (2013.01)

(58) Field of Classification Search
   CPC ..... G06F 40/166; G06F 40/197; H04L 67/06; H04L 67/1095; H04L 67/2842
   USPC ....................................................... 715/229
   See application file for complete search history.

(56) References Cited

U.S. PATENT DOCUMENTS

| | | | |
|---|---|---|---|
| 5,473,772 A | 12/1995 | Halliwell et al. | |
| 5,504,879 A | 4/1996 | Eisenberg et al. | |
| 5,740,430 A | 4/1998 | Rosenberg et al. | |
| 5,805,809 A | 9/1998 | Singh et al. | |
| 5,829,022 A | 10/1998 | Watanabe et al. | |
| 6,026,413 A | 2/2000 | Challenger et al. | |
| 6,088,702 A | 7/2000 | Plantz et al. | |
| 6,105,037 A | 8/2000 | Kishi | |
| 6,119,151 A | 9/2000 | Cantrell et al. | |
| 6,151,624 A | 11/2000 | Teare et al. | |
| 6,185,608 B1 | 2/2001 | Hon et al. | |
| 6,198,824 B1 | 3/2001 | Shambroom | |
| 6,219,675 B1 | 4/2001 | Pal et al. | |
| 6,434,543 B1 | 8/2002 | Goldberg et al. | |
| 6,510,458 B1 | 1/2003 | Berstis et al. | |
| 6,578,054 B1 | 6/2003 | Hopmann et al. | |
| 6,687,793 B1 | 2/2004 | Thomas et al. | |
| 6,697,844 B1 | 2/2004 | Chan et al. | |
| 6,701,345 B1 | 3/2004 | Carley et al. | |
| 6,701,428 B1 | 3/2004 | Harvey, III et al. | |
| 6,754,621 B1 | 6/2004 | Cunningham et al. | |
| 6,816,891 B1 | 11/2004 | Vahalia et al. | |
| 6,850,941 B1 | 2/2005 | White et al. | |
| 6,952,741 B1 | 10/2005 | Bartlett et al. | |
| 7,062,515 B1 | 6/2006 | Thomas et al. | |
| 7,171,619 B1 | 1/2007 | Bianco | |
| 7,254,617 B2 | 8/2007 | Schuh | |
| 7,337,392 B2 | 2/2008 | Lue | |
| 7,469,408 B2 | 12/2008 | Carter et al. | |
| 7,590,665 B2 | 9/2009 | Thomas et al. | |
| 8,117,152 B2 | 2/2012 | Thomas et al. | |
| 8,161,019 B2 | 4/2012 | Bailor et al. | |
| 8,219,526 B2 | 7/2012 | Clarke et al. | |
| 8,286,077 B2 | 10/2012 | Zhang et al. | |
| 8,452,728 B2 | 5/2013 | Thomas et al. | |
| 8,510,848 B1 | 8/2013 | Zhao et al. | |
| 8,539,080 B1 | 9/2013 | Uluderya et al. | |
| 8,645,318 B2 | 2/2014 | Thomas et al. | |
| 8,825,597 B1 | 9/2014 | Houston et al. | |
| 9,110,911 B2 | 8/2015 | Thomas et al. | |
| 9,292,536 B2 | 3/2016 | Thomas et al. | |
| 9,497,292 B2 | 11/2016 | Goldman | |
| 9,507,651 B2 | 11/2016 | McDonald et al. | |
| 9,594,768 B2 | 3/2017 | Thomas et al. | |
| 9,898,520 B2 | 2/2018 | Hawa et al. | |
| 10,057,318 B1* | 8/2018 | Rashid ................ H04L 67/1095 | |
| 10,089,324 B2 | 10/2018 | Thomas et al. | |
| 10,218,778 B2* | 2/2019 | Wesley .................. H04L 67/10 | |
| 10,275,510 B2 | 4/2019 | Hawa et al. | |
| 10,324,903 B1* | 6/2019 | Goldberg ............ G06F 16/1744 | |
| 10,339,156 B2 | 7/2019 | Hawa et al. | |
| 10,552,382 B2 | 2/2020 | Thomas et al. | |
| 2001/0027420 A1 | 10/2001 | Boublik et al. | |
| 2001/0032254 A1 | 10/2001 | Hawkins | |
| 2002/0107835 A1 | 8/2002 | Coram et al. | |
| 2002/0129065 A1 | 9/2002 | Shiohara | |
| 2003/0101223 A1 | 5/2003 | Pace et al. | |
| 2003/0182450 A1 | 9/2003 | Ong et al. | |
| 2004/0172423 A1 | 9/2004 | Kaasten | |
| 2004/0205452 A1 | 10/2004 | Fitzsimons et al. | |
| 2004/0230894 A1 | 11/2004 | Elza et al. | |
| 2005/0050067 A1 | 3/2005 | Sollicito et al. | |
| 2005/0091339 A1 | 4/2005 | Rudolph | |
| 2005/0278458 A1 | 12/2005 | Berger et al. | |
| 2006/0047804 A1 | 3/2006 | Fredricksen et al. | |
| 2006/0101100 A1 | 5/2006 | Konidena et al. | |
| 2006/0117018 A1 | 6/2006 | Christiansen | |
| 2006/0161841 A1 | 7/2006 | Horiuchi et al. | |
| 2007/0033569 A1 | 2/2007 | Davidson et al. | |
| 2007/0061327 A1* | 3/2007 | Oscherov ............ H04L 67/1097 | |
| 2007/0220417 A1 | 9/2007 | Mathew et al. | |
| 2009/0157802 A1* | 6/2009 | Kang .................. H04L 67/1095 | |
| | | | 709/203 |
| 2009/0249222 A1 | 10/2009 | Schmidt et al. | |
| 2009/0276698 A1 | 11/2009 | Clarke et al. | |
| 2010/0287253 A1 | 11/2010 | Xie et al. | |
| 2011/0209064 A1 | 8/2011 | Jorgensen et al. | |
| 2011/0289404 A1 | 11/2011 | Fleur et al. | |
| 2011/0320889 A1 | 12/2011 | Balasubramanyan et al. | |
| 2012/0033254 A1 | 2/2012 | Numata | |
| 2012/0036178 A1 | 2/2012 | Gavini et al. | |
| 2012/0089906 A1 | 4/2012 | Reeves et al. | |
| 2012/0101980 A1* | 4/2012 | Taleghani ........... G06F 17/2288 | |
| | | | 707/608 |
| 2012/0117481 A1 | 5/2012 | Stevens et al. | |
| 2012/0173612 A1 | 7/2012 | Vegesna-Venkata et al. | |
| 2012/0192064 A1 | 7/2012 | Antebi et al. | |
| 2012/0284602 A1 | 11/2012 | Seed et al. | |
| 2012/0296889 A1 | 11/2012 | Davydok et al. | |
| 2013/0054514 A1 | 2/2013 | Barrett-Kahn et al. | |
| 2013/0226872 A1* | 8/2013 | Barefoot ................. G06F 16/27 | |
| | | | 707/638 |
| 2013/0226876 A1* | 8/2013 | Gati ...................... G06F 16/178 | |
| | | | 707/652 |
| 2013/0254656 A1 | 9/2013 | Florian | |
| 2013/0262551 A1 | 10/2013 | Hasuike et al. | |
| 2014/0032489 A1 | 1/2014 | Hebbar et al. | |
| 2014/0081912 A1* | 3/2014 | Liu ........................ H04J 3/0658 | |
| | | | 707/610 |
| 2014/0250064 A1 | 9/2014 | Hopmann et al. | |
| 2014/0250066 A1* | 9/2014 | Calkowski .............. H04L 67/06 | |
| | | | 707/624 |
| 2014/0282826 A1 | 9/2014 | Bastide | |
| 2014/0351211 A1 | 11/2014 | Albouze | |
| 2014/0365436 A1* | 12/2014 | Calienes ............. H04L 67/1095 | |
| | | | 707/620 |
| 2015/0012488 A1 | 1/2015 | van Rossum | |
| 2015/0081633 A1 | 3/2015 | Su et al. | |
| 2015/0193408 A1 | 7/2015 | Ho | |
| 2015/0248444 A1 | 9/2015 | Prahlad et al. | |
| 2015/0278168 A1 | 10/2015 | Hawa et al. | |
| 2015/0278330 A1 | 10/2015 | Hawa et al. | |
| 2016/0034433 A1 | 2/2016 | Yamat et al. | |
| 2016/0070685 A1 | 3/2016 | Williams et al. | |
| 2016/0088077 A1 | 3/2016 | Liu et al. | |
| 2016/0127452 A1 | 5/2016 | Newman et al. | |
| 2016/0139768 A1 | 5/2016 | Lemonik et al. | |
| 2016/0182626 A1 | 6/2016 | Endahl et al. | |
| 2017/0154053 A1 | 6/2017 | Thomas et al. | |
| 2017/0185573 A1 | 6/2017 | Milvaney | |
| 2018/0144039 A1 | 5/2018 | Hawa et al. | |
| 2018/0150477 A1* | 5/2018 | Jewell ................. H04L 67/1095 | |
| 2018/0349408 A1 | 12/2018 | Jewell et al. | |

(56) References Cited

U.S. PATENT DOCUMENTS

2018/0357254 A1    12/2018   Thomas et al.
2019/0272281 A1     9/2019   Hawa et al.

OTHER PUBLICATIONS

Notice of Allowance for U.S. Appl. No. 14/620,414, dated Mar. 25, 2019, 8 pages.
Notice of Allowance for U.S. Appl. No. 16/105,768, dated Jul. 23, 2019, 8 pgs.
Mecozzi, Donna and Minton, James, Design for a Transparent, Distributed File System, IEEE Symposium on Mass Systems, 1991, pp. 77-84.
Dasgupta, "Resource Location in Very Large Networks," Proceedings of IEEE Workshop on Services for Distributed and Networked Environments, Jun. 27-28, 1994, pp. 156-163, IEEE # 0-8186-5835-5/94.
Vetter et al., "Mosaic and the World-Wide Web," Computer, Oct. 1994, pp. 49-57, vol. 27, Issue 10, IEEE.
Obraczka et al., "Internet Resource Discovery Services," Computer, Sep. 1993, pp. 8-22, vol. 26, Issue 9, IEEE.
Sharma et al., "Hypertext Based Distributed Object Management for Information Location and Retrieval," Proceedings of Engineering Management Society Conf. on Managing Projects in a Borderless World, IEEE, Dec. 17-18, 1993, 6 pages, 102-107.
Encryption and Decryption, Microsoft Corp., 2 pages, printed Feb. 9, 2001, at wysiwyg://101/http://msdn.microsof....brary/wcedoc/wcesecur/crypto_1.htm.
Turley, "Design Specification for Packaged Application Support in Assassin," Vignette Corporation, Austin, Texas, 1999, 6 pages.
Turley, Functional Specification for Packaged Application Support in Assassin, Vignette Corporation, Austin, Texas, 1999, 6 pages.
Office Action issued for U.S. Appl. No. 10/033,242, dated Jul. 8, 2004, 30 pages.
Office Action issued for U.S. Appl. No. 10/033,242, dated Mar. 4, 2005, 31 pages.
Office Action issued for U.S. Appl. No. 10/033,242, dated Aug. 24, 2005, 11 pages.
Office Action issued for U.S. Appl. No. 11/328,526, dated Jun. 6, 2008, 15 pages.
Office Action issued for U.S. Appl. No. 13/335,782, dated Oct. 3, 2012, 9 pages.
Office Action issued for U.S. Appl. No. 14/107,906, dated Jul. 16, 2014, 6 pages.
Cheriton et al., "A Caching Model of Operating System Kernel Functionality," SIGOPS Operating Systems Review, vol. 29, Jan. 1995, p. 1-4.
Order Re Post-Trial Motions, pp. 1-4, 10-15 (upholding validity U.S. Pat. Nos. 7,062,515, 7,590,665, 8,117,152), *Open Text S.A.* v. *Box, Inc. et al.*, No. C 13-cv-04910-JD (N.D. Cal.), Aug. 19, 2015, 22 pages.
Verdict Form, pp. 7, 8 (verdict on validity of U.S. Pat. Nos. 7,062,515, 7,590,665, 8,117,152), *Open Text S.A.* v. *Box, Inc. et al.*, No. C 13-cv-04910-JD (N.D. Cal.), Feb. 13, 2015, 9 pages.
Order Granting Open Text's Motion for Summary Judgment That TreeComp 3.6 is Not Prior Art, *Open Text S.A.* v. *Box, Inc. et al.*, No. C 13-cv-04910-JD (N.D. Cal.), Jan. 30, 2015, 4 pages.
Defendants Invalidity Contentions and Document Production Pursuant to Patent Local Rules 3-3 and 3-4, pp. 1-12, Exhibits C1-C16, *Open Text S.A.* vs *Box, Inc. et al.*, No. C 13-cv-04910-JD (N.D. Cal.), Jun. 27, 2014, 10,459 pages.
Defendants Box, Inc. and Carahsoft Technology Corporation's Preliminary Election of Asserted Prior Art, pp. 1-6, *Open Text S.A.* vs *Box, Inc. et al.*, No. C 13-cv-04910-JD (N.D. Cal.), Jul. 9, 2014, 11 pages.
Defendants' First Supplement to Invalidity Contentions, pp. 1-5, *Open Text S.A.* v. *Box, Inc. et al.*, No. C 13-cv-04910-JD (N.D. Cal.), Jul. 28, 2014, 22 pages.
Defendants' Condensed Invalidity Contentions Pursuant to Court Order, pp. 1-11, Exhibits C3, C4, C8, C9, C11, C12, C16, *Open Text S.A.* v. *Box, Inc, et al.*, No. C 13-cv-04910-JD (N.D. Cal.), Oct. 17, 2014, 466 pages.
Defendants' Notice of Prior Art, pp. 1, 10-14, *Open Text S.A.* v. *Box, Inc. et al.*, No. C 13-cv-04910-JD (N.D. Cal.), Jan. 2, 2015, 16 pages.
Claim Construction Order, pp. 1-3, 15-21, *Open Text S.A.* v. *Box, Inc. et al.*, No. C 13-cv-04910-JD (N.D. Cal.), Dec. 1, 2014, 21 pages.
Supplemental Claim Construction Order, pp. 1-3, *Open Text S.A.* v. *Box, Inc. et al.*, No. C 13-cv-04910-JD (N.D. Cal.), Jan. 28, 2015, 4 pages.
WS_FTP Pro "User's Guide," Software Version 5, Ipswitch, Inc. Lexington, MA, 1998, 104 pages.
Braam, "The Coda Distributed File System," Linux Journal, Issue 50, Jun. 1, 1998, 17 pages.
Satyanarayanan et al., "Coda File System User and System Administrators Manual," Aug. 1997, 82 pages.
CODA version 5.3.10, Carnegie Mellon Univ., <_DEFS001094_codarpms_listings.txt>, 1997-1998, 109 pages.
"DocuShare 2.2 Administration Guide," 2000, Xerox Corporation, Norwalk, CT, 62 pages.
Readme.txt, DocuShare Client_Readme, Xerox Corporation, Norwalk, CT, 11 pages.
"Docushare 2.2", 2010, Xerox Corporation, Norwalk, CT, <_DEFS013958_DocuShare_listing.txt>, 1 page.
"TreeComp version 3.6, NKI/AvL", <_DEFS013979_TreeComp-3-6_listing.txt>, 1995-1999, 1 page.
Magellan Explorer version 2.0c, Enriva Development DA, Tromso, Norway, <_DEFS013966_MagellanExplorer_listing.txt>, 1 page.
License.txt, Software License Agreement, Magellan Explorer, Enriva Development DA, Tromso, Norway, 3 pages.
Readme.txt, Magellan Explorer v2.0c, Enriva Development DA, Tromso, Norway, 7 pages.
whatsnew.txt, Magellan Explorer v.2.0c, Enriva Development DA, Tromso, Norway, 1 page.
Guy et al. "Rumor: Mobile Data Access Through Optimistic Peer-to-Peer Replication," Jun. 27, 2014, 12 pages.
Reiher, "Rumor 1.0 User's Manual," 1998, 9 pages.
"Using the Intra.doc! Management System with the ODMA Intra.doc! Client," Version 2.0, IntraNet Solutions, Inc., (Copyright 1996-1998), 48 pages.
Intra.doc! Management System "Archiver Guide", IntraNet Solutions, Inc., Eden Prairie, MN, (Copyright 1998), 32 pages.
Intra.doc! Management System, "Batch Loader," Version 3.0.3, IntraNet Solutions, Inc., Eden Prairie, MN, (Copyright 1996-1998), 28 pages.
"Archiver Installation for NT," Intradoc! Management System Archiver System, Version 3.5 (undated), 1 page.
Intra.doc! Management System "Installation Guide for Windows NT," Version 3.5, IntraNet Solutions, Inc., Eden Prairie, MN, (Copyright 1996-1998), 51 pages.
"ODMA Intra.doc! Client Installation," Version 2.0, IntraNet Solutions, Inc., Eden Prairie, MN, (Copyright 1996-1998), 8 pages.
"Release Notes," Intra.doc! Management System, Version 3.5, Sep. 30, 1998, IntraNet Solutions, Inc., Eden Prairie, MN, 5 pages.
Intra.doc! Management System "Installation Guide for Solaris," Version 3.5, IntraNet Solutions, Inc., Eden Prairie, MN, (Copyright 1996-1998), 35 pages.
Intra.doc! Management System "System Properties," Version 3.5, IntraNet Solutions, Inc., Eden Prairie, MN, (Copyright 1996-1998), 14 pages.
Intra.doc! Management System "System Administration Guide," Version 3.5, IntraNet Solutions, Inc., Eden Prairie, MN, (Copyright 1996-1998), 124 pages.
Intra.doc! Management System "Update Installation Guide for Windows NT," Version 3.5, IntraNet Solutions, Inc., Eden Prairie, MN, (Copyright 1996-1998), 20 pages.
Intra.doc! Management System "User Guide," IntraNet Solutions, Inc., Eden Prairie, MN, (Copyright 1996-1998), 111 pages.
Mason et al,, "GNOME User's Guide," (Copyright 1999), Red Hat Software and David A. Wheeler, 110 pages.

(56) References Cited

OTHER PUBLICATIONS

"User's Guide for Windows 32-Bit," Novell GroupWise, Version 5.5 (Copyright 1998) Novell, Inc., Provo, UT, 322 pages.
Rogers et al., "Novell's GroupWise 5.5 User's Handbook," Copyright 1998 by Novell, Inc., Provo, UT, 277 pages.
Rogers et al., Readme,txt, "Novell's GroupWise 5.5 Administrator's Guide," IDG Books Worldwide (Copyright 1999), 6 pages.
"GroupWise 5.5 ReadMe," Jul. 15, 1998, Novell, Inc., Provo, UT, (Copyright 1998), 10 pages.
"GroupWise 5.5 Monitor ReadMe," Jul. 15, 1998, Novell, Inc., Provo, UT, (Copyright 1998), 2 pages.
"GroupWise Backup Utilities," GroupWise, Jun. 17, 1998, 7 pages.
Readme.txt, GroupWise Enhancement Pack, Aug. 14, 1996, 5 pages.
gwtipus.txt, GroupWise 5.5, Apr. 29, 1998, 8 pages.
Readme.txt, GroupWise 4.1 Async Gateway v2 NLM, Jul. 9, 1998, 16 pages.
smtpuser.txt, GroupWise, Mar. 19, 1996, 9 pages.
preamble.txt, GroupWise, Oct. 20, 1995, 1 page.
"GroupWise 5.5 Internet Agent Readme," Jul. 15, 1998, Novell, Inc., Provo, UT, (Copyright 1998), 3 pages.
Groupwise 5 Readme.txt, Nov. 5, 1996, Novell, Inc., Provo, UT, 20 pages.
Groupwise 5.5 Readme.txt, Oct. 2, 1998, Novell, Inc., Provo, UT, 12 pages.
Ogle, "Practical Experience with OS/2 Installable File Systems," Software—Practice and Experience, vol. 22(7), Jul. 1992, (received May 6, 1991), pp. 537-551.
Cute FTP 4.2.2, GlobalSCAPE, Inc., San Antonio, TX, <_DEFS013961_ CutelFTP_listing.txt>, 1 page.
Cute FTP Notes.txt, Dec. 11, 2000, GlobalSCAPE, Inc., San Antonio, TX, 9 pages.
Cuteftptips.txt, GlobalSCAPE, Inc., San Antonio, TX, 2 pages.
FTP Voyager 7.0.0.0 <_DEFS013964_ftpVoyager_listing.txt>, 1 page.
License.txt, License Agreement, FTP Voyager, Gaylord, MI, 2 pages.
PrintFAX.txt , FTP Voyager Print and Fax Order Form, FTP Voyager, Gaylord, MI, 1 page.
Readme.txt, FTP Voyager Readme File, FTP Voyager Version 7.0, Rhino Software, Inc. (Copyright 1997-1999), 3 pages.
Web Drive Version 2.2, River Front Software, <_DEFS013968_ WebDrive_listing.txt>, 1 page.
Absolute FTP Version 1.7, Van Dyke Technologies, Inc., <_DEFS013959_AbsoluteFTP_listing.txt>, 1 page.
ftpNetDriver Version 2.21, KnoWare, Inc., <_DEFS013963_ ftpNetDrive_listing.txt>, 1 page.
War FTP Daemon v. 1.7, <_DEFS013954_WarFTPDaemon_listing. txt>, 1 page.
Office Action issued for U.S. Appl. No. 15/017,189, dated Jun. 2, 2016, 9 pages.
Office Action issued for U.S. Appl. No. 14/555,385, dated Jun. 23, 2016, 15 pages.
Xianqiang et al., "SyncViews: Toward Consistent User Views in Cloud-based File Synchronization Services," IEEE 2011, pp. 89-96.
Bodker et al., "A Network Protocol for Remote Collaborative Authoring on the Web," Springer 1999, pp. 291-310.
Office Action issued for U.S. Appl. No. 14/555,385, dated Nov. 22, 2016, 15 pages.
Office Action issued for U.S. Appl. No. 14/555,385, dated Apr. 19, 2017, 13 pages.
Office Action issued for U.S. Appl. No. 14/620,414, dated Jun. 13, 2017, 14 pages.
Office Action issued for U.S. Appl. No. 15/431,343, dated May 16, 2017, 10 pages.
Housel et al., WebExpress: A client/intercept based system for optimizing Web browsing in a wireless environment, Mobile Networks and Applications 3, 1998, pp. 419-431, Baltzer Science Publishers BV.
Office Action issued for U.S. Appl. No. 14/620,414, dated Oct. 4, 2017, 18 pages.
Office Action Issued for U.S. Appl. No. 15/431,343, dated Nov. 29, 2017, 9 pages.
Office Action Issued for U.S. Appl. No. 14/620,414, dated Mar. 9, 2018, 18 pages.
Notice of Allowance issued for U.S. Appl. No. 15/431,343, dated May 18, 2018, 6 pages.
Office Action issued for U.S. Appl. No. 15/862,236, dated Aug. 23, 2018, 6 pages.
Wang et al., On the Impact of Virtualization on Dropbox-like Cloud File Storage/Synchronization Services, IEEE 2012, pp. 1-9 (2012).
Office Action issued for U.S. Appl. No. 14/620,414, dated Oct. 11, 2018, 17 pages.
Notice of Allowance issued for U.S. Appl. No. 15/862,236 dated Dec. 17, 2018, 5 pages.
Swierk et al., "The Roma Personal Metadata Service," 2002 Kluwer Academic Publishers, Mobile Networks and Applications 7, pp. 407-418.
Office Action for U.S. Appl. No. 15/824,639, dated Apr. 8, 2020, 10 pgs.

* cited by examiner

| ContentEditSampleDocs | | | | | |
|---|---|---|---|---|---|
| Application | | abx_a_format.pdf ▷ | Edit Open Download | 237 KB | 08/13/2013 11:08 AM |
| Microsoft Excel (22) | | avologintime.csv | Edit Open Download | 2 KB | 08/12/2013 10:34 AM |
| Microsoft Word (6) | | Chrysanthemum.jpg 1112 | Functions | 859 KB | 03/03/2013 07:18 AM |
| Adobe PDF (4) | | DemoPresentation.ppt ▷ | 1114 | 104 KB | 08/12/2013 10:40 AM |
| Microsoft Powerpoint (1) | | Desert.jpg ▷ | Edit Open Download | 52 KB | 06/26/2013 12:26 PM |
| Microsoft Project (1) | | Desktop.zip ▷ | Edit Open Download | 2 MB | 05/01/2013 10:55 AM |
| More... | | DetailedMovingPlan.mpp ▷ | Edit Open Download | 543 KB | 08/13/2013 10:57 AM |
| Content Type | | ExampleDesigner.tds ▷ | Edit Open Download | 157 KB | 12/07/2012 03:36 PM |
| Document (51) | | foox.docx ▷ | Edit Open Download | 21 KB | 08/12/2013 10:18 AM |
| Custom View (2) | | fooyyy.pdf ▷ | Edit Open Download | 4 KB | 05/29/2013 12:17 PM |
| Folder (2) | | Hydrangeas.jpg ▷ | Edit Open Download | 582 KB | 03/03/2013 07:18 AM |
| Search Query (2) | | Jellyfish.jpg ▷ | Edit Open Download | 14 KB | 05/10/2013 11:06 AM |
| E-mail (1) | | K&L_Excel_Files ▷ | | 18 Items | 03/12/2013 03:40 PM |
| More... | | Koala.jpg ▷ | Edit Open Download | 763 KB | 03/03/2013 07:18 AM |
| Document Type | | Lighthouse.jpg ▷ | Edit Open Download | 180 KB | 05/09/2013 12:54 PM |
| Office (37) | | LinkingFolder ▷ | | 2 Items | 08/15/2013 06:04 PM |
| Images (13) | | Master1.xlsx ▷ | Edit Open Download | 10 KB | 12/17/2012 01:59 PM |
| Other (7) | | Moving ▷ | | 1 Source | 02/07/2013 02:57 PM |
| More... | | MyFirstOpenOfficeDoc.odt ▷ | Edit Open Download | 9 KB | 05/10/2013 11:08 AM |
| Email_Attachments | | | | | |
| No (1) | | | | | |

SYSTEMS AND METHODS FOR SEAMLESS ACCESS TO REMOTELY MANAGED DOCUMENTS USING SYNCHRONIZATION OF LOCALLY STORED DOCUMENTS

CROSS-REFERENCE TO RELATED APPLICATION(S)

This application is a continuation of, and claims a benefit of priority under 35 U.S.C. 120 of, U.S. patent application Ser. No. 15/862,236, filed Jan. 4, 2018, entitled "SYSTEMS AND METHODS FOR SEAMLESS ACCESS TO REMOTELY MANAGED DOCUMENTS USING SYNCHRONIZATION OF LOCALLY STORED DOCUMENTS", which is a continuation of, and claims a benefit of priority under 35 U.S.C. 120 of, U.S. patent application Ser. No. 14/555,385, filed Nov. 26, 2014, entitled "SYSTEMS AND METHODS FOR SEAMLESS ACCESS TO REMOTELY MANAGED DOCUMENTS USING SYNCHRONIZATION OF LOCALLY STORED DOCUMENTS", which claims a benefit of priority under 35 U.S.C. 119 to U.S. Provisional Application No. 61/970,278, filed Mar. 25, 2014, entitled "SYSTEMS AND METHODS FOR VIRTUAL FILE DRIVER MONITOR AND AUTOMATIC DOCUMENT LINKING", and U.S. Provisional Application No. 61/970,270, filed Mar. 25, 2014, entitled "SINGLE CLICK EDIT SYSTEMS AND METHODS", the entire contents of which are hereby incorporated herein for all purposes.

TECHNICAL FIELD

This disclosure relates generally to the field of content management. More specifically, the disclosure relates to a system and method to enable users to locally access and interact with files stored on a content management system in a seamless manner using synchronization provided by a file driver monitor on the local system.

BACKGROUND

With the ever increasing prevalence and proliferation of electronic content has come a commensurate need for the management of such content. Content management systems do just that, allowing for the management of such content by controlling the access, editing, updating, versioning, etc. of content. This type of content management is in no way trivial. In certain contexts, such as in an enterprise setting, there may be millions or even billions of documents that need to be managed, and users may desire to have access to these documents from a variety of distributed access points.

To facilitate content management in conjunction with such distributed access, content management systems may be organized around one or more content management servers that provide services associated with the management of such content. Content management servers like these may be deployed in the cloud or otherwise distributed.

Using such content management systems then, users may access managed content to, for example, edit such content. To access such content users typically use a user interface (UI) to interface with a content management server of the content management system. They reserve (or "check out") the content and download it locally on their computer (e.g., referred to as a client). The user can then edit the document, save the changed version to the content management server and unreserve the content.

While these tasks may seem simple on their face, the underlying complexity and operations that must be performed by the content management server to ensure such functionality is smoothly accomplished is vast. For example, many users may be trying to simultaneously access or edit documents from different access points. Thus, in a content management system, there is often a need to control access to content, retain old versions of content, reconcile different versions of content, etc.

As the user interactions with a content server are typically accomplished over a network and the operations undertaken may be complex in nature, the performance of such content management systems (especially from a user perspective) is somewhat lacking. In no small part, these performance issues resulted from the architecture of such systems. As all accesses to content must be made through the content management server substantially every time, and access to the content management system is itself dependent on network speed, the performance of such content management systems is heavily dependent on the speed and connectivity of the network connection and the number of users being the services provided by the content management system.

What is desired therefore, are seamless systems and methods for the management of content that provides the advantages of editing locally stored content to the user while simultaneously providing the advantages that are inherent with the use of a content management system.

SUMMARY

To that end, attention is directed to embodiments of providing seamless access to remotely managed content through the synchronization of locally stored content as disclosed herein. In particular, certain embodiments include a content management system for editing files stored on a remote content management server. A sync agent deployed on a client computing device coupled over a network to the content management server may be provided. The client computing device includes a file system and a local cache associated with the content management system in the file system of the client. The sync agent is configured to send a request to the content management server for a document stored at the content management server, receive the document in response to the request, store the document in the local cache associated with the content management system, and maintain an identifier for the document. In such embodiments, a cache filter is disposed between an editor application on the client computing device and the file system. The cache filter is configured to intercept file system requests from the editor application when the document in the local cache is open for editing. These file system requests can include a save request associated with a change to the document in the local cache.

In certain embodiments, a save request to the content management server is made automatically and asynchronously to the editing of the document in the local cache through the editor application. In response to receiving such a request, the cache filter further can inform the sync agent of the save request such that the sync agent makes that save request to the content management server to make the equivalent change to the document on the content management server. The cache filter may also pass the save request to the file system so that the change can be made on the document in the local cache.

In one embodiment, the content management server locks the document at the content management server when the document is requested by the sync agent. As such, other users accessing that document may be prevented from editing that document or from opening that document in an edit mode.

As the changed document may be managed as its own document (e.g., another version of the document) in some embodiments, the content management server may generate a new identifier for this most recent version of the document and send the new identifier to the sync agent in response to the save request. The new identifier may be maintained in association with the document in the local cache of the client computing device. Such identifiers may include, for example, a node identifier (e.g., identifying a set of versions of the same document) and a version number for the document.

Various embodiments of content management systems as presented herein may convert links within the documents. For example, any local inter-document links contained in the document stored in the local cache may be converted to global inter-document links or any global inter-document links in the document received from the content management server may be converted to local inter-document links in the document stored in the local cache.

As such, embodiments of these types of content management systems may have many advantages. For example, when using these embodiments, a user experiences the speed and access as if he is working on the document locally and all the document synchronization takes place asynchronously so the user can work while he is offline. All the synchronization services to keep a document synchronized and managed properly in a distributed or enterprise wide environment may occur unobtrusively to the user.

Accordingly, a content management system architecture is provided in that a local client with a cache allows editing of documents without a need to access the document from a content management server of an enterprise. In one embodiment, a content management system provides a seamless way to a user to be able to access documents for editing on a local cache instead of having the user edit them on a content management server located in a cloud and connected via an Internet connection. The local cache contains the documents on which the user is working on at a client computer and it speeds up the editing process of the documents that are being synched with the content management server. This provides a seamless way to allow a user to access the documents on the local cache of a client computer to speed up the access process. The documents on the local cache of the client computer are synced with a content management server in the background but are saved on the local cache without any impact to the user by intercepting requests by various applications such as an editor (e.g., Microsoft Word) using a file system driver that interacts between the local cache and a sync agent to sync the documents with the content management server. This provides the advantages that a user is not required to have a complete Internet connectivity and editing of documents can be accomplished in a speedier manner. Further, functionalities of an application can be used more seamlessly, such as the most recently used (MRU) files list of Microsoft Word.

The content management system may be a cloud-based system in one embodiment. The content management system provides a background interception of a Windows file system access by an application such as Word. This is done by getting the newest version and uploading the changes and reserving and unreserving—all in the background without the user having to intervene, and the user thinks that he is operating in the cloud while actually, operations happen in his Windows file system. The user does not have to wait for several minutes until his large file, such as a 150 megabyte file, is uploaded on a very slow Internet connection. The file is saved instantaneously through the user's hard disk drive, and the upload happens in the background while the user is doing something else. He is not waiting on it.

Embodiments of such a content management system may thus be effective as an enterprise solution. A user can have confidence that his actions (e.g., file actions such as open or save) will succeed because he is working on documents that are all saved on a local Windows file system, and the editor is opening up documents or saving documents to the Windows file system, which is robust. Therefore, the user will have confidence in his editing of the document and it adds to the experience, since editing and saving is done from a local hard disk drive.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 11 is a screenshot depicting one embodiment of a content server browser interface, including a listing of documents with edit links.

DETAILED DESCRIPTION

Figure 1:
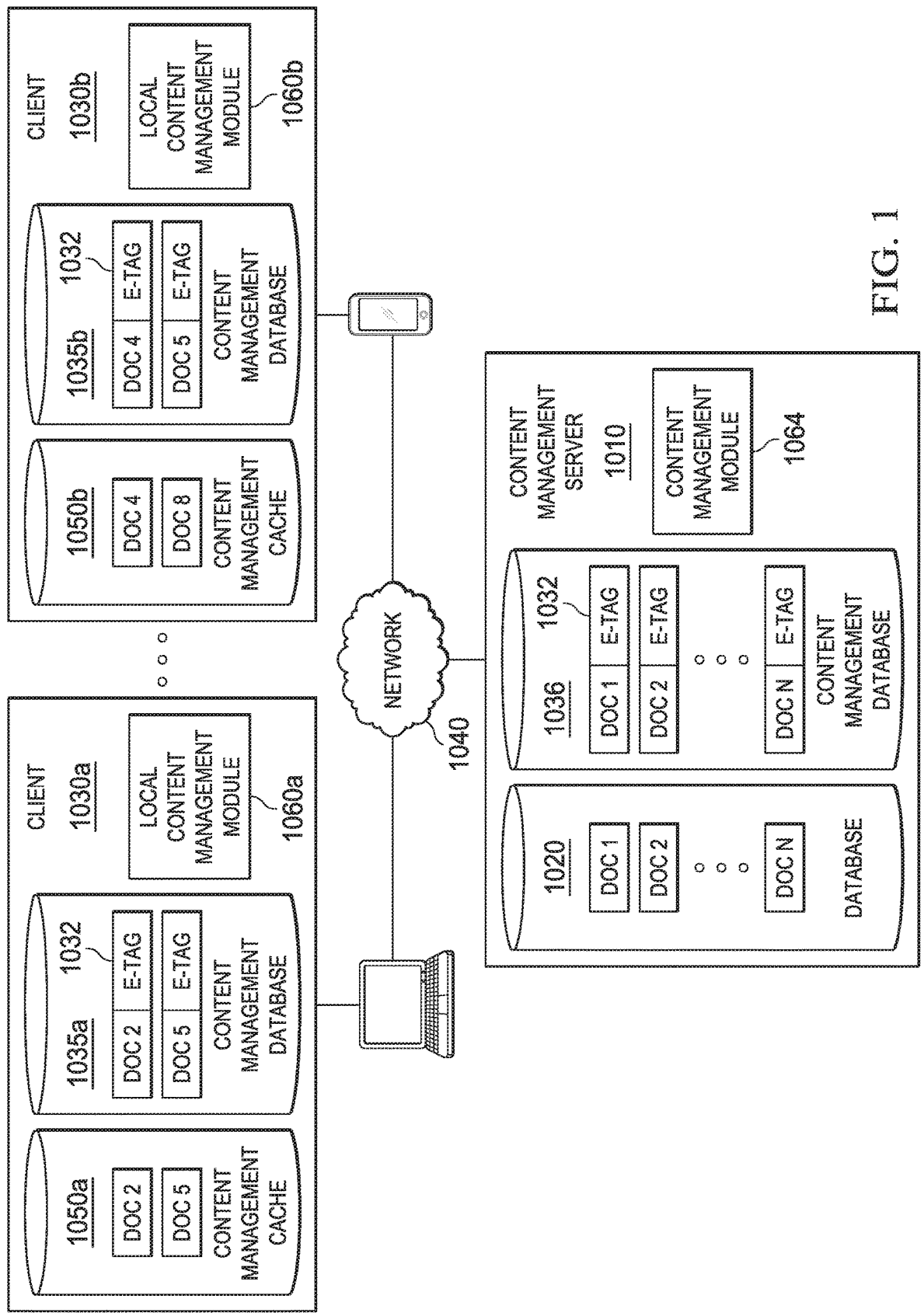
FIG. 1 a block diagram depicting one embodiment of an environment in which an editing system may be implemented.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Generally, a system is provided that enables editing and other access capabilities of content accessed from a content management server using a locally-installed application through the synchronization of locally stored content. To clarify some terminology as it is used herein, it will be understood here that the terms content, document or file may be used interchangeably herein to refer to a discrete set of data; it will also be understood that the term content server is used interchangeably with a content management server. In some examples, editing of a file is done by editing the file by accessing the file in the local cache of a client device of the user performing the editing. A file to be edited is downloaded from a content management server to a cache local to the user's client device where it can be accessed by applications installed on the client device. The location of the local content management cache is configurable. Document saves are performed locally and uploaded to the enterprise content management server asynchronously. No direct user interaction with the content management server is needed to save documents. All saves are performed using the client device application's save buttons. Documents get unreserved or unlocked automatically upon closing of the client device application. No further user action is required by a user. In some embodiments, global document links are maintained, even while the document is stored in a local cache.

Among other advantages and benefits, the system described below improves the user experiences involved in editing, or otherwise accessing, documents. Specifically, the user may interact with managed content just as if the user was interacting with content stored locally on that user's local storage and file system (e.g., on that user's C: drive) despite the fact that such content is under the control and management of a content management system. In particular, the system provides an 'instant' and 'seamless' editing experience substantially equivalent to editing files on a local hard disk. The system ensures that the user can always save documents, and works with most existing applications installed on a client device. At the same time, the system preserves key capabilities of the content server system. The system also supports and preserves inter-document linking (e.g., desktop application inter-document linking). Generally, the system uses a seamless synchronization technique for uploading and downloading documents, instead of opening and saving documents directly to a cloud-based application. As described in detail below, client applications edit documents using standard file system paths to a local hard disk or roaming profile. Those file system paths directly access a local document cache, so that opening and saving of previously downloaded documents can be fast and reliable. The operations performed by editing applications on cached documents are tracked, so that the system can determine when a new version of a document has been saved and should be uploaded to the content management server. New or updated versions of documents are uploaded in the background so that the user never has to wait for an upload to complete. When a client application accesses a document in the cache, it is automatically downloaded from the content management server, if necessary. In one example, an application in the client device system tray on the task bar provides an unobtrusive user interface (UI) for communicating with the user as necessary, and reporting on the status of pending operations.

Speed of access is another advantage provided by embodiments as disclosed herein. In the past, users accessed documents for editing on a network from a content management server and thus every time there was a save request, a synchronous save of the document to the content management server was required. In embodiments as presented herein, an architecture is provided where the user's client device maintains a local cache that such editing of documents can be provided separately from a content management server for an enterprise containing the same documents. Synchronization between documents in the local cache (or edits thereto) can be performed between the user's client device and the content management server asynchronously.

In certain embodiments, the documents in the local cache of the client device are synced with corresponding documents on the content management server in the background but are saved on the local cache without any impact to the user by intercepting requests by various applications such as an editor (e.g., Microsoft Word, Excel, PowerPoint, etc.) being used to edit the documents using a filter that resides between the application layer and the file system. The filter can obtain edits to such documents made by the user through the editor application from the intercepted file system requests (e.g., save requests or the like). The file system requests can then be passed to the underlying file system to perform the requested operation on the document in the local cache. This filter utilizes a sync agent to queue one or more requests to the content management server, where the requests are configured to synchronize the locally stored document in the cache with the corresponding document at the content management server by performing equivalent edits (e.g., equivalent to the edits determined from the intercepted requests) on the corresponding document at the content management server.

By divorcing the editing and the synchronization processes through the use of the local cache, the filter, and the sync agent, a seamless and speedy way to allow a user to access documents subject to content management is obtained. By providing a seamless way for a user to be able to access documents for editing using a local cache instead of having the user edit them on a content management server located in a cloud and connected via an Internet connection, a user is not always required to have an Internet connectivity and editing of documents can be accomplished in a speedier manner, and functionality of applications may be used seamlessly, such as the most recently used (MRU) files list of Microsoft Office applications (e.g., Word, Excel, etc.).

A content management server of a content management system provides a metadata handling system to handle a document that has extra metadata on it that a user wishes to enter. The content management server helps with managing that metadata. It allows a user to enter that metadata when the user creates a new document. For example, the user can save the document from the application (e.g., Word) with the correct metadata associated with it. The content management server may provide business rules that apply to documents, and this feature may be integrated in the content management system. To customers, the content management system provides a folder hierarchy where if they save a document to that particular folder, they have to enter certain pieces of metadata.

When a user is saving a new document to a particular folder through an application (e.g., by selecting "save as", etc.) the content management system may prompt the user for the metadata and then save that metadata back to the content management server. If a document in the content management system, e.g., in a document cache, needs to be uploaded to a folder where that folder requires metadata, a user will be prompted at the time of upload of the document for entering that metadata. If the user doesn't enter that metadata, the document will not be uploaded. The logic or intelligence for workflows or restrictions that are associated with the documents can be implemented partially on the content management server side and partially on the client side.

The content management server may offer a different type of versioning called a major/minor versioning where one can have version 1, version 1.1, version 1.2, and then one can go from 1.2 to version 2, and depending on the number of the version, let's say, currently applied on documents—users have certain permissions. For example, certain users may only have permissions to edit a minor, but they cannot edit a major. So the content management system works with the content management server to make sure it is properly adhered to.

Turning first to FIG. 1, a block diagram of an example of an environment in which a content management system may be implemented is depicted. The content management system may include content management server 1010 including content management module 1064 and associated database 1020; and a local content management module 1060 (e.g., local content management modules 1060a, 1060b, etc.) with a content management cache 1050 (e.g., content management caches 1050a, 1050b, etc.) and a content management database 1035 (e.g., content management databases 1035a, 1035b, etc.) on each client device 1030 (e.g., client device 1030a, client device 1030b, etc.). Local content management module 1060 may access content management module 1064 on the content management server 1010 over network 1040, which may be a LAN, WAN, Internet, etc. For clarity, FIG. 1 shows only two client devices 1030 and one content management server 1010, although it should be understood that a system may include multiple clients and multiple content management servers. Specifically, local content management module 1060 may access the content management module 1064 using a web-based interface, an application programming interface, or another type of interface. Additionally, other modules (not shown) may reside on client devices 1030 and may be used by a user to interact with content management module 1064 on content management server 1010.

Content management server 1010 may manage content (e.g., Doc 1, Doc 2, etc.) in database 1020 using content management module 1064. Local content management module 1060 on client device 1030 allows a user on the client device 1010 to seamlessly access content managed by content server 1010 and stored in database 1020 (e.g., Doc 1, Doc 2, etc.). Local content management module 1060 may be installed on the client device 1030 at the request of a user or, for example, when the user accesses content management module 1060 using another interface. For example, in certain embodiments, content management module 1064 may provide an interface that may be accessed using a web browser. When a user at a client device 1030 accesses this browser based interface, a module (e.g., including JavaScript or the like) may be executed or otherwise loaded on the client device (e.g., by the browser at the client device 1030). This module may determine if the local content management module 1060 is deployed on the client device 1030. If the local content management module 1060 is not already installed on the client device 1030, the local content management module 1060 may be downloaded from content management server 1010 and installed on client device 1030.

Additionally, at this time local content management module 1060 can determine if a content management cache 1050 or content management database 1035 exists on that client device 1030. If not, the local content management module 1060 may create the content management cache 1050. Content management cache 1050 may be a location (e.g., one or more folders) on the local file system of client device 1030. It should be noted that in some cases, this file system may reside on a physical storage medium local to the client device 1030; however, in certain other instances, a local file system of a client device 1030 is actually a networked filed system such that the storage of the actual data of the local file system does not actually reside on the client device 1030 but is instead accessed over a network. Local content management module 1060 may also create a content management database 1035 where management data associated with the management of content (e.g., content stored in content management cache 1050) may be stored.

As will be discussed in more detail, local content management module 1060 includes one or more modules that communicate with one or more interfaces provided by content management module 1064 on content server 1010 to allow the user at the client device 1030 to seamlessly access the content (e.g., Doc 1, Doc 2, etc.) in database 1020 managed by the content management server 1010. In particular, a user may attempt to access managed content in a variety of ways, including through the previously discussed web based interface or directly through an editing application, etc.

When content is accessed, local content management module 1060 can determine if the requested content is in the content management cache 1050. If not, the accessed content may be requested from content management module 1064 on content management server 1010. In certain embodiments, even if the accessed content exists in the content management cache 1050, identifying information for the content may be sent to content management module 1064 to determine if the version of the content stored in the content management cache 1050 is the most recent version. The content management module 1064 may reply with the requested content and identifying information. The content may be stored in the content management cache 1050 and identifying information associated with that content stored in the content management database 1035. For example, as depicted in FIG. 1, Doc 2 and Doc 5 are stored in the content management cache 1050a of client device 1030a, while Doc 4 and Doc 8 are stored in the content management cache 1050b of client device 1030b.

In one embodiment, such identifying information may include an e-tag. An e-tag may be a unique identifier associated with each piece of content managed by the content management system. In particular, in order to manage content in the content management system (e.g., as stored in database 1020, etc.), the content management module 1064 may utilize a node identifier. A node identifier may serve to uniquely identify a particular content item regardless of its location in the file system (e.g., the file system structure associated with database 1020) or version.

In other words, there may be multiple stored versions of the same content item (e.g., that may be different as when a document is edited, etc.) and each of those versions would have the same node identifier to associate the different versions. Each of those versions would be managed as a distinct piece of content and to manage the different versions of the same content item, there may be a different version number associated with each version. For example, as illustrated in the example of FIG. 1, Doc 1a may be a first version of a content item and Doc 1b may be a second version of the content item. Each of these versions is stored separately and managed as separate content items. However, Doc 1a and Doc 1b may have the same node identifier to indicate they are different versions of the same content item. Additionally, other metadata may be associated with each content item such as the size of the document, a timestamp indicating a last save time, etc.

Accordingly, an e-tag may be one or more pieces (or combination thereof) of metadata associated with a content item. An e-tag may contain enough information that the content management module 1060 will be able to, for example, locate the content item in database 1020 (e.g., in the file system stored on database 1020), even in cases where the content item has changed location on the file system, or determine if a content item (e.g., in content management cache 1050) is a latest or same version of that content item, etc. For example, an e-tag may include a node identifier for the corresponding content item and an indication of length of the file or may be a combination of the node identifier, the size of the content item, its version number and a time stamp of when it was last saved, etc.

The example of FIG. 1 depicts that the e-tags 1032 for Doc2 and Doc 5 are stored in the content management database 1050*b* of client device 1030*a*, while e-tags 1032 for Doc 4 and Doc 8 are stored in the content management database 1035*b* of client device 1030*b*, while e-tags 1032 for all content (e.g., Doc 1-Doc N) are stored in content management database 1036 of content management server 1010.

It will be understood, however, that while the embodiment of FIG. 1 depicts that e-tags 1032 are stored on client devices 1030 and content management server 1010 such they are associated with the corresponding content item, it may be the case that only the metadata that may be used to create an e-tag may need to be stored and that the e-tags may be created, or information extracted therefrom, as needed. For example, content management module 1064 may create such e-tags when needed from the stored metadata and evaluate a received e-tag to extract the metadata contained therein (e.g., node identifier, size, timestamp, etc.). Thus, in such cases, the actual e-tag itself may not need to be stored on client device 1030 or content management server 1010.

In any event, the user may then access the content through the editing application, as the user makes changes to the documents and such changes are saved to that content as stored in content management cache 1050. In other words, the saves from the editing application are directed to the local file system where content management cache 1050 storing the content resides. The editing application requests for saving changes to that document may be intercepted or otherwise processed by local content management module 1060. Based on these changes, local content management module 1060 may formulate and send one or more requests to content management module 1064 to perform these changes on the content item stored at content management server 1010. Content management module 1064 may receive such request and preform the requested change on the content item in database 1020. The editing application requests processed by local content management module 1060 may then be passed to the local file system (e.g., the file system driver) on the client device 1030 such that the changes may be performed on the content item as stored in the local cache 1050.

The e-tag or metadata associated with the content may also be updated as well. For example, in one embodiment, the content management module 1064 on the content management server 1010 may store the updated content item (e.g., the content item on which the changes have been performed) as a new piece of content and send back an e-tag associated with the new content to local content management module 1060 on the client device 1030. The e-tag received by the local content management module 1060 may be used to overwrite the old e-tag associated with that content in content management database 1035. Likewise, the updated content would be used to replace the old content or saved as a newer version of the content separately. As the changes have been performed on the content stored in the content management cache 1050 and the e-tag associated with the content has been updated, the content stored in the local content management cache 1050 is now the most current version of the content and corresponds to the most current version of that content item on the content management server 1010 (e.g., using the updated e-tag).

It will be noted that the requests sent to the content management module 1064 may be formed and sent asynchronously with both the user's actions on the content using the editing application and the processing of the requests on the local file system of the client 1030. Specifically, by allowing the user to edit the content using the content as stored in the local content management cache 1050 and intercepting local editing application requests, the synchronization of content in the local content management cache 1050 and the content on the content management server 1010 may be made. In other words, the user can interact with and access the content as if it is stored in his local file system; however, the content is still under the management of the content management system 1010 and the canonical version of the content may be maintained at the content management server 1010.

Figure 2:
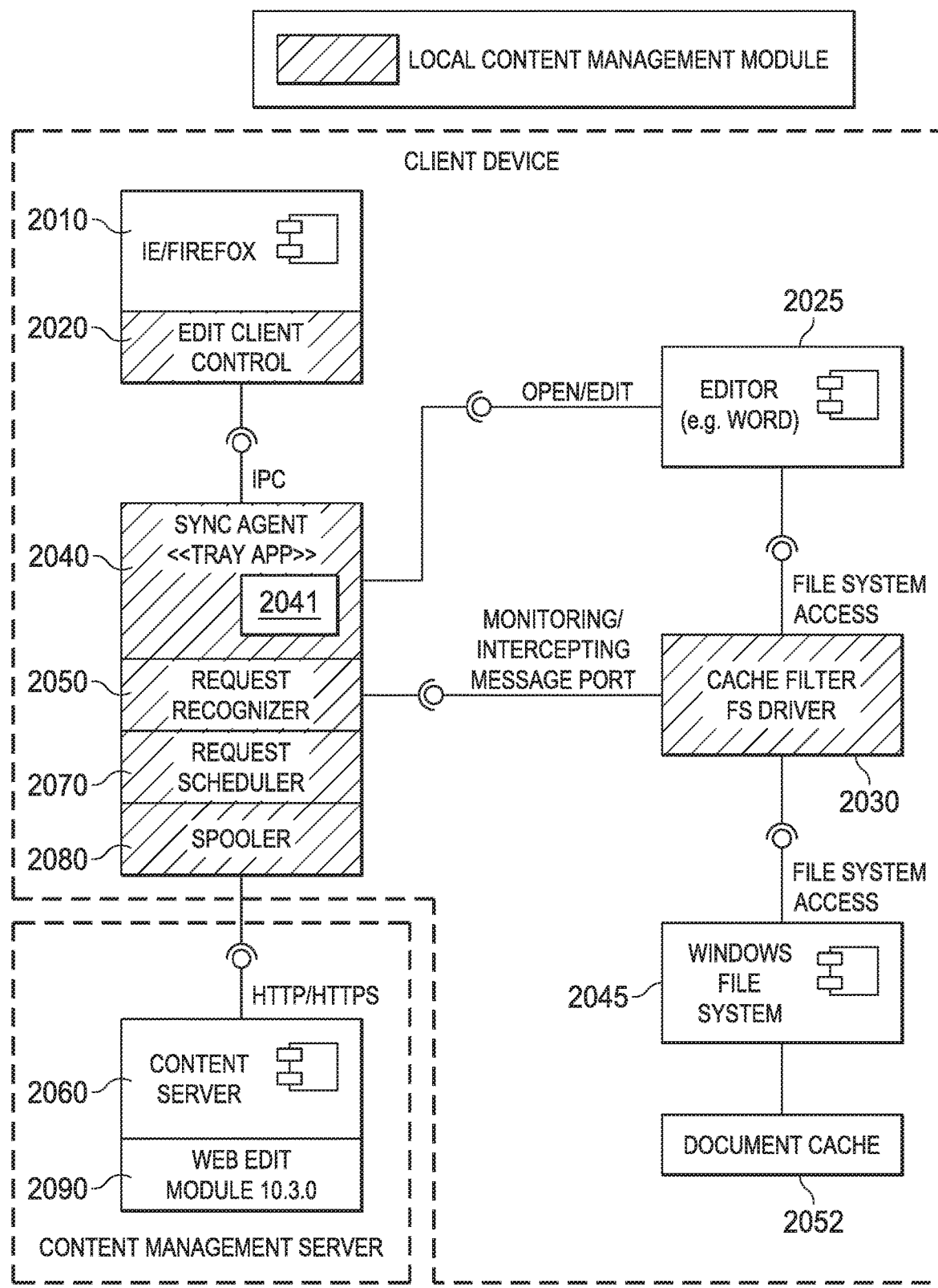
FIG. 2 is a component diagram depicting various components of one embodiment of an editing system.

FIG. 2 is a component diagram depicting various components and non-limiting embodiments of a content management system. While FIG. 2 has been depicted using a particular operating system, editing application, file system, browser, etc., it will be understood that these are provided by way of example only and that embodiments as depicted herein may be equally well utilized with other operating systems, applications, browsers, file systems, etc.

Specifically, in certain embodiments, a local content management module of a content management system on a client device includes an edit client control 2020, a sync agent 2040 (which may be an application in the System Tray or menu bar of an operating system or the like) and a cache filter 2030. A content management module of the content management system on a content management server 2060 includes a web edit module 2090. As mentioned above, a client device may use a web-based interface to access a content server. FIG. 2 shows a web browser 2010 (e.g., Internet Explorer, Firefox, etc.) installed on a client device. An edit client control 2020 is available as an in-process ActiveX control or a Firefox plugin, for example. Generally, the edit client control 2020 is used for initiating editing operations through a browse based interface. The edit client control 2020 provides an API or other interface that clients call to control local editing functions. The edit client control 2020 allows the interfaces provided from the content management server 2060 web pages (e.g., to create an area in the document cache 2052 corresponding to the active content server). The edit client control 2020 also configures server access and authentication parameters for that location. The edit client control 2020 can pre-load the document cache 2052 with documents downloaded from the content server 2060. The edit client control 2020 also launches editing applications (e.g., application 2025 in FIG. 2 such as Word, Excel, PowerPoint, etc.) in response to user input, for example, in response to a user clicking on a file link. The control API is primarily a proxy to a named inter-process communication pipe (e.g., IPC API) in the sync agent 2040. The system also uses this API to perform similar functions.

A cache filter driver (also called a file system driver or cache filter) 2030 may be a device driver interfacing between a client editing application 2025 and the file system 2045. The file system driver 2030 enables file monitoring and synchronization, as well as the tracking of editing operations performed on a file. The cache filter driver 2030 implements a kernel-level file system filter driver that can monitor and control file system operations directed to the local document cache 2052 through file system 2045. It performs operations that cannot be performed using the standard monitoring APIs provided by the operating system (OS). When a client application such as application 2025 opens a cache file in document cache 2052, for example, the filter driver 2030 can block the application 2025 until the latest version of the document is downloaded from the content management server 2060, if necessary. It can also report detailed information about which applications are opening files and how. The cache filter driver 2030 exposes a communication port that a sync agent 2040 may use to control and query it or that conversely filter driver 2030 may use to make requests or otherwise interact with the sync agent 2040.

When the cache filter driver 2030 is running the content management system, it serves multiple users. A user logged in as a user A on the system has his own personal cache. Another user B logged into the system will have his own personal cache. While the users will have their own cache, the cache filter driver 2030 runs as one instance, and it monitors, e.g., two absolutely different locations at the same time, and it signals the instance of the sync agent 2040 for the user A when something happens in his cache, and it signals the sync agent 2040 for the user B if some activity is happening in connection with his cache. So the cache filter driver 2030 communicates with different instances of the sync agent 2040.

The sync agent 2040 enables synchronization between each user's document cache 2052 and the content management server 2060, and provides all of the interfaces 2041 for communicating status to the user, requesting credentials when necessary, etc. In one example, the sync agent 2040 is a system tray application. The sync agent 2040 loads in each user's session upon log in, and communicates with the filter driver 2030 to establish monitoring and interception in that user's document cache 2052. Note that a single instance of the filter driver 2030 can serve many users' sync agents 2040 simultaneously, although each user may have a different document cache 2052 location. When a client application first accesses a file in the document cache 2052, the filter driver 2030 notifies the sync agent 2040 and requests access. The sync agent 2040 will download the document if the version in cache 2052 is not up to date, and then notify the filter driver 2030 that the access can proceed. The filter driver 2030 then passes the request along to the underlying file system 2045 (e.g., as implemented by the operating system of the client device) and the client application 2025 behaves exactly as it does for local file editing. As applications 2025 continue to access or modify documents in the cache, the file system driver 2030 notifies the sync agent 2040 about those operations. From that event stream, combined with events generated by standard OS-provided monitoring, the sync agent 2040 components determine update/reserve/unreserve or update/lock/unlock operations that may need to be performed on content managed by content management server 2060, and issue requests to content management server 2060 to perform such operations in the background.

The sync agent 2040 handles a request, determining when a file will be uploaded, when it needs to be reserved, etc. A request recognizer 2050 collects information from a subsystem driver and what comes from the editor 2025 requests as well. A request scheduler 2070 determines which requests have a higher priority or a lower priority. A spooler 2080 directly sends requests to the content management server 2060. The spooler 2080 communicates with the request scheduler 2070 to get requests from it.

A request recognizer 2050 determines which operations need to be performed on the content server 2060. The request recognizer 2050 receives information about the sequence of file system events that editing applications 2025 perform on the document cache, as well as the sequence of content management server operations being performed. From these two streams, the request recognizer 2050 generates and maintains information about the state of each file in the cache 2052, and which content management server operations need to be performed. The request recognizer 2050 might determine, for example, that a file in the cache 2052 is open for writing, and that no attempt has been made to reserve or lock it in content management server 2060. It may determine that a reserve or lock request should be made for a document in this state, and ensure that such a request is pending in the request scheduler 2070 (described below). The request recognizer 2050 might also determine that a file has been modified since it was last uploaded, that it is available for reading by other applications, and that it is no longer open for writing by other applications. In this state, the request recognizer 2050 would ensure that an upload request to content server 2060 is pending.

A request scheduler 2070 determines the order in which operations are performed on the content management server 2060. The request recognizer 2050 continually adds and removes pending requests from the request scheduler 2070 as the state of files in the document cache 2052 changes. As the set of pending requests fluctuates, the request scheduler 2070 tracks their relative priorities. When the spooler 2080 (described below) is available to make a request to the content management server 2060, it consults the request scheduler 2070 to find the highest priority request to perform. Note that, in this example, the request scheduler 2070 may not be a queue or may be a managed queue. Any request can be removed from the request scheduler 2070 at any time if the request recognizer 2050 determines that it is no longer necessary to perform it.

Spooler 2080 may be configured to communicate with the content management server 2060. In some embodiments, to avoid overloading the content management server 2060, the spooler 2080 will make only one HTTP request to the content server 2060 at a time. Iteratively, the spooler 2080 performs the following functions.

(1) Gets the highest priority request from the request scheduler 2070. If there are no pending requests, it waits for one to appear.

(2) Informs the request recognizer 2050 that it is performing the request. This will cause the request to be removed from the request scheduler 2070 if it is still pending. The request recognizer 2050 may indicate at this point that the request is no longer required, in which case the following steps are not performed.

(3) Sends the request to the content management server 2060.

(4) Informs the request recognizer 2050 about the completion and status (success or fail, data returned with the request, etc.) of the request.

The web edit module 2090 (content server module) implements the content server's integrated editing UI, and any request handlers that the sync agent 2040 or other modules on the client device need to use. Web edit module 2090 may thus provide a browser based UIs that may provide certain functionality such as authentication of a user and an interface which presents documents that the user may select to edit. The web based interface (as will be discussed in more detail later) may present set of documents that the user may select for editing. The documents may be presented as links that a user may select, where each link is associated with a URL for that document. The URL may include an e-tag (or other metadata) associated with the document such that the document can be identified using data contained in the URL. The request handlers of the web edit module 2090 may receive requests from sync agents 2040 deployed on client devices, carry out requested operations on content management server 2060 and respond to such requests. For example, one request handler is the download hander used by the spooler 2080. This may be an interface handler with an integrated version check, so that a single request can check to see if the version of a document in local cache 2052 is out of date, and provide the appropriate document in a response.

Thus, using the content management system, a user may edit a document. The initiation of such editing may occur through a variety of channels. In one example, a user may select a document to edit using the web based interface provided by web edit module 2090. The user can navigate folders and documents to which he has access permissions and select a document for editing. The edit client control 2020 may, for example, provide a link for a document that a user may edit (based on the user's permissions) to initiate the editing process.

The web based interface provided by web edit module 2090 may have a component (e.g., edit client control 2020 or portions thereof) that may be executing on the client device (e.g., JavaScript in the user's browser) and can determine if sync agent 2040 or cache filter 2030 are installed and configured on the client device. If they are not installed or configured, edit client control 2020 may install and configured the sync agent 2040 and cache filter 2030. At this point, cache 2052 for use by the local content management module on the client device may be created if it does not exist. This cache 2052 may be a location on the local file system 2045 of the device. This cache 2052 may be one or more folders (or sub-folders) in the local system 2045.

In some cases, however, a particular client device may connect to multiple, different content management servers 2060, each managing different content. In such cases, a particular cache 2052 may be associated with a particular content server 2060 (and there may be multiple local caches or folders within a local cache).

For example, the cache 2052 may be created with a name that will correspond to the name of the content management server 2060. Cache 2052 may be configured in a user's local file system 2045, where the cache 2052 may include a server "A" folder for use with content management server "A". Such folders may further contain sub-folders that correspond to the file system structure accessible by the user at the content management server. Thus, in certain embodiments, the file structure for the cache 2052 (or portion thereof) associated with a particular content management server 2060 may mirror the file system structure accessible by the user on that content management server 2060.

Alternatively, a user may select to open a document from editor 2025, for example, by using an MRU shortcut provided by editor 2025 (such as Word or the like). Such shortcuts may provide a list of document recently edited by the user (or through the application 2025). In this manner, a user may be able to access a document in cache 2052 without access to the network. A user may also choose to edit documents using a UI 2041 provided by sync agent 2040. Such a UI 2041 may allow the viewing and selection of documents in local cache 2052 for editing. In one embodiment, the UI 2041 lists all of user files in the cache 2052, and there are buttons to operate on them. UI 2041 may provide a grid view that lists all the documents in the cache 2052: their name, their status (e.g., synced, locked, waiting to be uploaded, being uploaded, being reserved status, etc.). The grid view in the window may be configured to list different folders then the actual location of the documents in local cache 2052 as it may not be desired for a user to have insight into the actual location of documents in cache 2052

The UI 2041 of the tray app has the manage documents view which shows the user exactly what stage the user is in and the request recognizer 2050 updates those streams basically at runtime, so the user can see how his files are being uploaded and then go into a state such as a reserve state. When a user saves a document or a file locally, an indication will appear in the managed document view for that file, but it will say that this file has never been uploaded and it's a new file.

Regardless of the method used by the user in attempting to edit a document, the data associated with the requested document may be provided to sync agent 2040. For example, if a user utilizes the web based interface provided by the web edit module 2090, the edit client control 2020 may notify sync agent 2040 of the request to edit a particular document and the URL (or e-tag or metadata) associated with the requested document. If a user selects a document using interface 2041 provided by sync agent 2040, the sync agent 2040 directly receives the request to edit the document directly from interface 2041, while if a user utilizes the MRU shortcut of application 2025 to select a document for editing, the request to open the file may be intercepted by cache filter 2030 which blocks the application 2025 while notifying sync agent 2040 of the request (along with identifying information for the requested file).

The sync agent 2040 receives the request and determines if the document referenced by the request is located in cache 2052. For example, the edit client control 2020 may pass the URL (or e-tag or metadata) associated with the requested document to the sync agent 2040. Sync agent 2040 may utilize the e-tag of that document to determine if that document is in the cache 2052. For example, sync agent 2040 may maintain or otherwise access a database containing a mapping between the documents in cache 2052 and e-tags (or other metadata) for those documents. Using such a mapping, it can be determined if the requested document is in cache 2052. Alternatively, the documents themselves may be named or otherwise tagged with the e-tag value for that document, thus sync agent can search the documents in cache to determine if any of them have a name (or tag) corresponding to the e-tag of the requested document. If, however, the document was accessed directly from the UI 2041 of the sync agent 2040 or through an MRU function of editor 2025, sync agent 2040 may determine the requested document is already in cache 2052 and determine the e-tag for the requested document.

When a user accesses the document through the MRU function of the editor 2025, editor 2025 attempts to open the document at an associated file path corresponding to that documents location in cache 2052 by issuing a file system request to file system 2045. Cache filter driver 2030 intercepts that request to the file system for the document at that file path. It then indicates to the sync agent 2040 that there is an open request for the document at the file path, or may pass the file name itself. The sync agent 2040 can determine the e-tag for that document from the file path or file name as discussed.

In any event, if the requested document is in cache 2052, sync agent 2040 may send a request to the content server 2060 (e.g., using the web edit module 2090) to determine if the document is the most recent version. This request may pass just the e-tag of the requested document. The content management server 2060 can compare this e-tag to the e-tag associated with the most recent version of that content to determine if the version of the content in cache 2052 represented by the e-tag received in the request is the most recent version. In one embodiment, the node identifier for the document may be extracted or otherwise determined from the received e-tag, this node identifier may be used by content management server 2060 to locate the documents on the content management server 2060 that have that node identifier (e.g., are versions of the same original content).

As such, the content management server 2060 may be able to locate documents corresponding to documents on the content management server database even in instances where such documents have moved location at the content management server 2060. Such documents may have been moved for a variety of reasons, including reorganization, folder cleanups, company directives, etc. As a node identifier is passed in the request from the sync agent 2040 and used by content management server 2060 to locate the versions of the document at the content management server, these documents may be located even in cases where versions of the document have changed location (e.g., file paths, directories, etc.), since being originally downloaded to cache 2052 or reside in different locations, etc.

From those located documents, the most recent version may be determined using the timestamp (e.g., which may be derived from the e-tag associated with that document or otherwise determined) associated with those documents. The e-tag of the most recent version of the content stored on content management server 2060 can then be compared to the e-tag of the document as received in the request to determine if they are the same. Based on the comparison a response may be sent to sync agent 2040 indicating that document in cache 2052 is, or is not, the most recent version of the content (e.g., if the e-tags are the same the response may indicate that the document in cache 2052 is the most recent version). Other methods of comparing the documents may also be utilized, for example, the size of the file may be determined from the e-tag received in the request from the sync agent 2040 and used to compare to the size of the most recent version of the document on content management server 2060. Other comparisons may also be utilized.

If the response indicates that the document in cache 2052 is the most recent version, editing of the document in cache 2052 opening of the document may proceed. If, however, the response indicates that the requested document in cache 2052 is not the most recent version, the sync agent 2040 may form a request to download the most recent version of the document. This request may have the e-tag associated with the version of the requested document in cache 2052, or the e-tag of the most recent version as may be provided by the content management server 2060 in the response indicating that the version of the requested document in cache 2052 was not the most recent version. Content management server 2060 may receive such a request and reply with the most recent version of the document (e.g., the binary content of the document) and the associated e-tag. The sync agent 2040 may then update the cache 2052 with the received version of the document and update any associated data (e.g., the e-tag associated with the document in the cache 2052). It will be noted that the requests to check the version of the document in cache 2052 may also serve as a download request in certain embodiments, such that one request may serve to check the version of the document in cache 2052 and if it is not the most recent version, content management server 2060 may reply with an indication that it is not the most recent version, along with the most recent version of the document and the associated e-tag.

In certain embodiments, sync agent 2040 may convert inter-document links within the document at the time the document is received, as will be discussed in more detail at a later point. Specifically, documents such as Word or Excel documents may include links to other documents. Such links can be global links pointing to the location of the included document in the content management server 2060. For example, each link may be in the form of a URL of the included document.

When sync agent 2040 receives document that includes such links, sync agent 2040 can then rewrite the links for included documents that exist in the received document to be stored in cache 2052 such that these links reference the location of the corresponding document as stored in cache 2052 (instead of referencing the same document at content management server 2060). This conversion process may be done using a mapping which correlates, or otherwise allows sync agent 2040 to determine, a location in cache 2052 from a location (e.g., URL) on content management server 2060. Such a mapping may be bi-directional such that the link conversion from local links in cache 2052 to links on content management server 2060 at the time a document is saved to content management server 2060.

Thus, when a user is interacting with the requested document and clicks on a document link contained within that document, the link to the included document in the cache 2052 is activated and the referenced document is accessed from cache 2052. Specifically, in some embodiments, the included documents may not be downloaded before a link referencing that document is clicked on (as such included documents may never actually be accessed by a user). In such cases, access to such a link may cause a request to be sent from editor 2025 to file system 2045. Cache filter driver 2030 can intercept such a request and the document can be downloaded as discussed herein.

Alternatively, sync agent 2040 may request (or be prompted to request) downloads of all those included documents from content management server 2060 at the time the requested document is originally received. Such an embodiment may be useful in cases where the content of included documents is actually visible in the requested document. For example, an Excel sheet may have links pointing to other Excel documents and Excel may automatically request such included documents.

In some embodiments, if the requested document is to be opened for editing, before the document is opened sync agent 2040 may reserve (or lock) the document with content management server 2060. Such a reservation request may include an identifier for the requested document (e.g., e-tag) and any needed user identification or credentials. The content management server 2060 may attempt to reserve the requested document at the content management server 2060 (e.g., such that no other user may edit that document while the user is editing the document at his client device). The reservation process may include checking the user's credentials to verify the user has edit permissions or the like. If the document can be reserved, the content management server 2060 may mark the document as reserved in the database of the content management server 2060 and return a response to sync agent 2040 indicating the document has been reserved. Once the file is reserved, the reservation may be maintained by the content management server 2060 until it is released (or the expiration of a time period, etc.).

It will be noted that such checking of the version of the document may be done in response to a reservation request such that a single request may attempt to reserve the document requested by the user and in response to the reservation request, the content management server 2060 may check to make sure the document in local cache 2052 is the latest version. In such cases, a response may indicate that the document is not the latest version or that the reservation has completed successfully or some other indicator of status. It will be noted that such a reservation request may only be needed in cases where the user has opened the document for editing, if the user only desires to open the document in a read-only mode there may be no need to perform such a reservation.

Once it is determined that most recent version of the document is present in cache 2052 (e.g., either a confirmation that the requested document in cache 2052 is the latest version or the latest version is received from content management server 2060 and stored in cache 2052, that the document has been reserved, etc.), the document may be opened. For example, if the user attempted to edit the document using the web based interface provided by, for example, web edit module 2090, or attempted to edit the document through the UI 2041 provided by the sync agent 2040, the sync agent 2040 may open an appropriate editor 2025 (if it is not already open) and, using an API or the like provided by the editor 2025, direct the editor to open the document at the location in the cache 2052. Alternatively, if the user attempted to edit the document by using the editor 2025, sync agent 2040 may notify the cache filter driver 2030 that the document is now available. Cache filter driver 2030 may then allow the originally received open request from editor 2025 to proceed to file system 2045 to open the document in the cache 2052 or may open the document in cache 2052 and return the document to the editor 2025. In other words, the cache filter driver 2030 blocks editor 2025 until the requested document (or latest version thereof) is available in cache 2052. This blocking may occur, in some embodiments, at the disk I/O level. If a document cannot be reserved, it may be set to a read-only mode. So the document is set to read-only mode in the cache 2052 such that editor 2025 may only open the document in a read-only mode when the file system request from editor 2025 is performed.

Accordingly, a user may interact with the requested document in editor 2025, where the requested document resides in cache 2052. If the document cannot be reserved as discussed above, a variety of actions may be taken, for example, the user may be allowed to view the version of the document in cache 2052 in read only mode.

During editing, when the user (or the editor 2025) makes a save request, the save request is intercepted by cache filter driver 2030 disposed between editor 2025 and file system 2045. The cache filter driver 2030 then makes a save request to the sync agent 2040. Sync agent 2040 may then send the save request to the content management server 2060, where the save request includes the document (or the changes thereto as can be determined from the save request intercepted by cache filter driver 2030) and the e-tag of the document being saved. At this point, if document links in the document have been modified (e.g., to local links), sync agent 2040 may rewrite the local links to global links before uploading it to content management server 2060.

Content management server 2060 may receive this save request and use the e-tag to verify that save is occurring over the correct version of the document. In other words, e-tag may be used to once again verify the user on the client device was working with the most recent version of the document before a new version of the document is created. If the received e-tag matches the e-tag of the most recent version of the content maintained by content management server 2060, a new version of the content (i.e., a new document) will be created at content management server 2060 and a corresponding new e-tag will also be created. This new e-tag will be returned to the sync agent 2040 in a response and stored in association with the document in cache 2052, thus serving to synchronize the same version of the same document maintained at content management server 2060 and in cache 2052 at the user's client device.

If the e-tag received in the save request at content management server 2060 does not match the e-tag for the latest version of the document at the content management server 2060 (e.g., if an error occurred and a new version was saved over the version the user is working with from cache 2052, etc.), the save request may be denied as a conflict may be created or versions inadvertently overwritten. In such cases, an error indication may be returned to sync agent 2040. The user can then be presented with a variety of options through UI 2041, such as saving a new version of the document or manually reconciling changes, etc.

At any point, if a user closes editor 2025 (or the document being edited), an unreserve request may be sent to content management server 2060. Specifically, editor 2025 may notify sync agent 2040 through an API or the like that the document has been closed. Sync agent 2040 may determine the document has been reserved and send an unreserve request to content management server 2060 with the e-tag of the document. Content management server 2060 may take the reservation mark off the document at content management server 2060 such that others may edit the document.

In this manner, improved editing of a managed document by a user may be accomplished by allowing a user to access and edit the document in a local cache while keeping the document synchronized in a content management system. The synchronization can occur asynchronously, improving the speed and performance of the editing process. A number of other advantages may also be obtained, for example If sync agent 2040 does not have network connectivity a warning saying the user is not online may be presented through UI 2041. In such cases, if the document exists in cache 2052, the user may be allowed to read or edit the document and changes synchronized with content management server 2060 at a later point when connectivity can be established. Similarly if a user is in the middle of an editing session and the network connection fails or goes down, the document will be saved into cache 2052 such that changes will not be lost.

Figure 3:
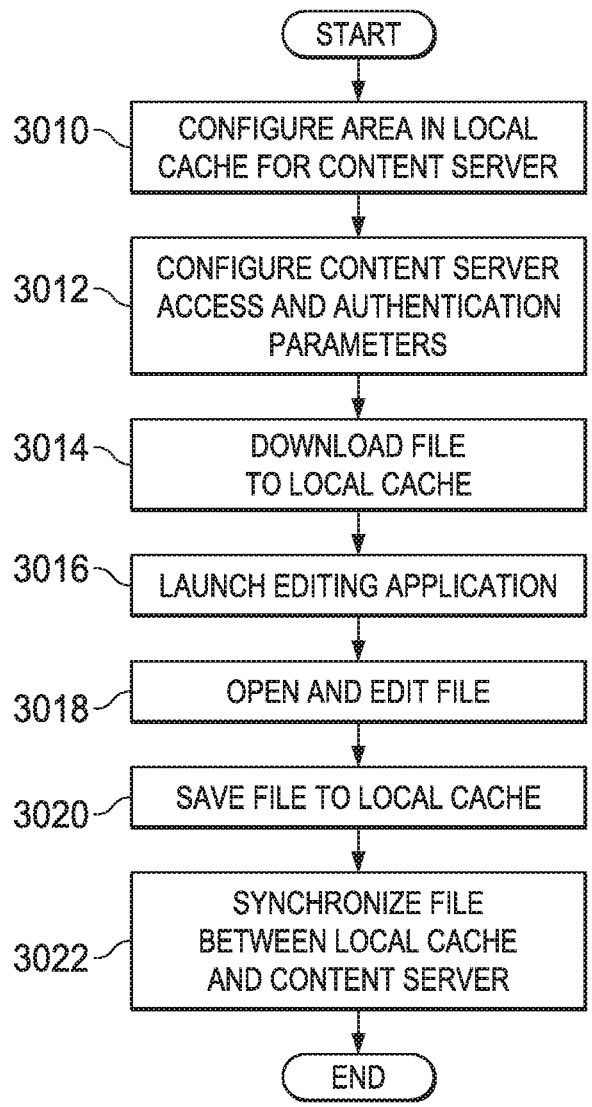
FIG. 3 is a flow chart depicting one embodiment of a process for locally editing a file from a content server.

FIG. 3 is a flow chart depicting a process for locally editing a file from a content management server. At step 3010, an area in local cache is configured for the content management server. At step 3012, the content management server access and authentication parameters are configured. At this point, files from the content server can be downloaded to the local cache in response to a request from a user. For example, if a user wants to edit a particular file, the user can click a link to the file on a content management server web interface to initiate the process. At step 3014, the selected file is downloaded to the local cache. Note that, if an up-to-date version of the file is already stored in the local cache, it does not need to be downloaded again. Next, a client editing application is launched (step 3016). The editing application can be any desired application, for example, Microsoft Word for editing a word processing file. At step 3018, the file is opened in the application for editing. Note that the file stored in cache is opened by the editing application, so from the user's perspective, editing the file works the same as editing any local file. At step 3020, the file is saved to the local cache. The saved file is then synchronized between the local cache and the content management server (step 3022). In this example, the saved file is uploaded to the content server, since the edited file is the most recent version of the file. Note that the system will prevent a second user from saving the file on the content management server while the first user is editing the file.

FIGS. 4-8 are state diagrams illustrating several use cases of the content management system described above. The state diagrams illustrate various operations and the handlers that execute each operation.

Figure 4:
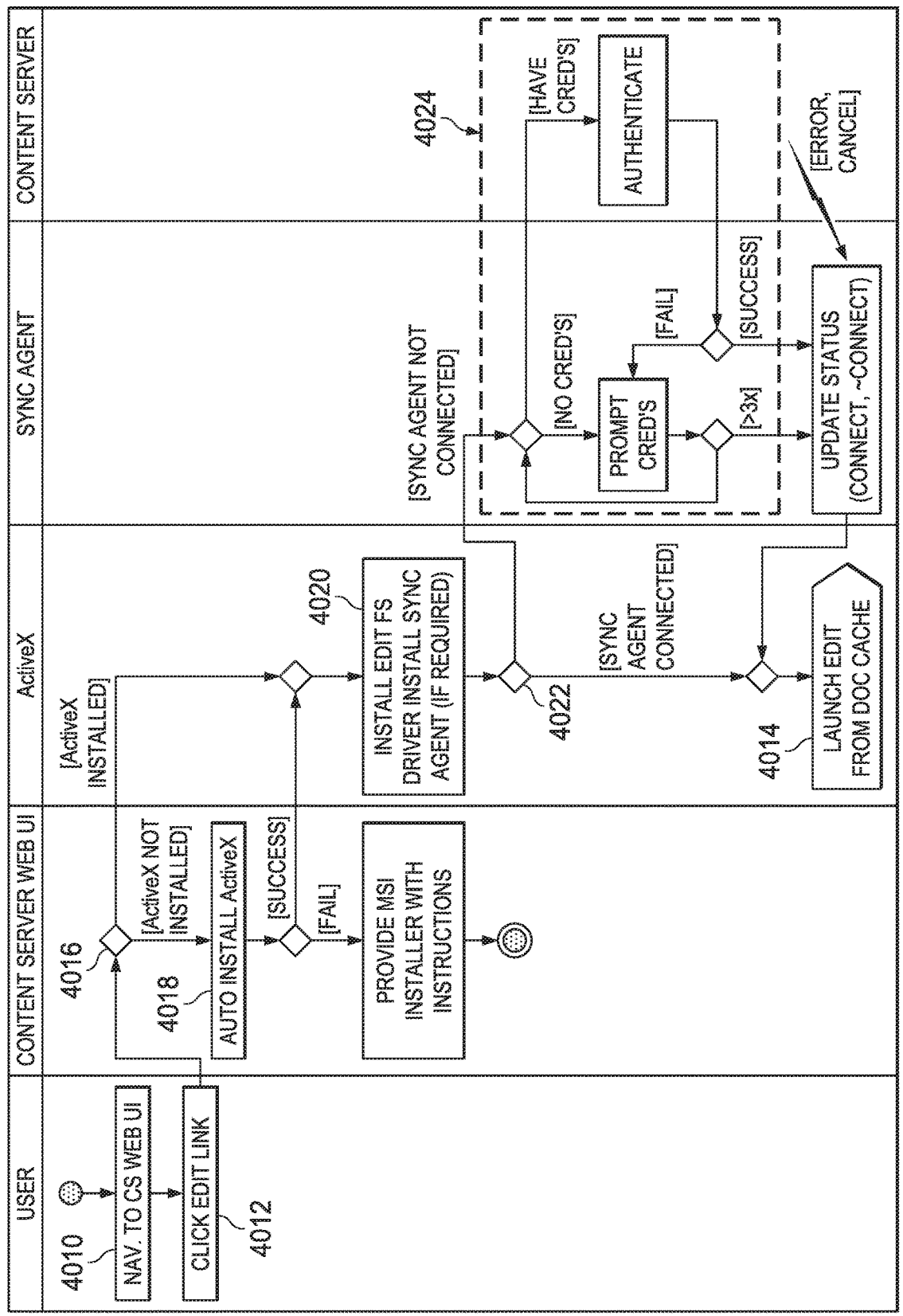
FIGS. 4-8 are flow diagrams depicting embodiments of process used by an editing system.

FIG. 4 is a state diagram illustrating when a user browses and initiates an editing operation. In one hypothetical example, a user is navigating through the content management server using one of its browsing interfaces (4010). The user then selects the 'Edit' function (4012) for a Microsoft Office document (e.g., assume a Word document), and the document is opened for editing in the appropriate local application (4014). The system ensures that the document cache is prepopulated with the document, and then transitions to the next use case (described below). FIG. 4 also shows various interim operations, such as determining whether ActiveX is installed (4016), installing ActiveX if it is not (4018), installing sync agent and file system drivers, if needed (4020), determining if the sync agent is connected (4022), connecting the sync agent, if needed (4024), etc.

Figure 5:
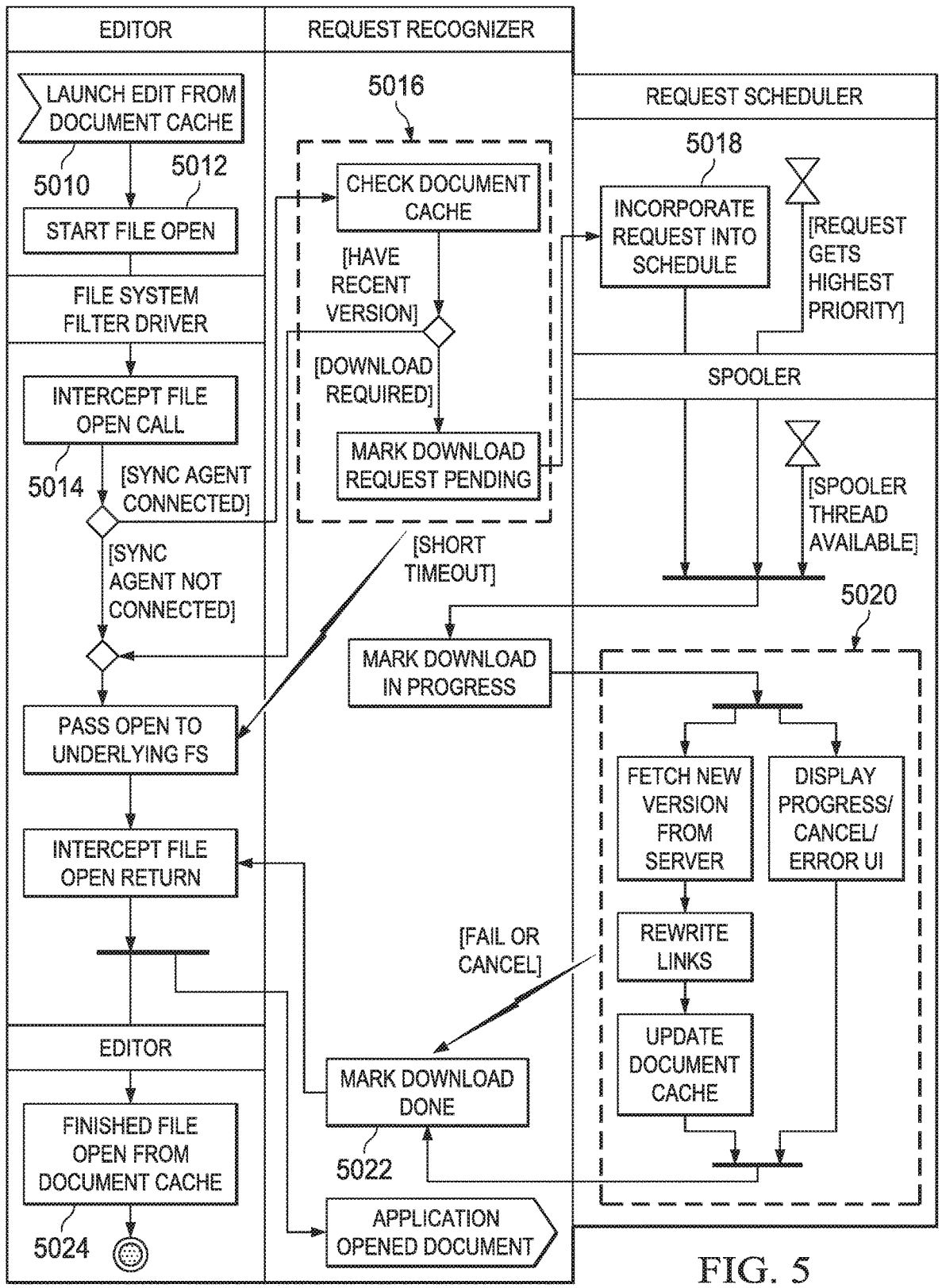

FIG. 5 is a state diagram illustrating when the document is opened in the editing application. The document cache will not always be prepopulated when the editing application opens a document. The user could choose a document from a file MRU list, a desktop shortcut, for example. If the document hasn't been opened for a long time, it is very likely that the version that the application tries to open up will not be the latest one, so the sync agent may need to download the document first.

As shown in FIG. 5, after the application is launched (5010) and the application attempts to open the file (5012), the file system filter driver intercepts the file open call (5014). This is to ensure that the most recent version of the file is opened. If the file stored in cache is not the latest (or doesn't exist), the file will be downloaded from the content server. The request recognizer checks the cache and marks a download request, if needed (5016). If a download is needed, the request scheduler schedules the request (5018), and the spooler starts the download (5020). In addition to fetching the file from the server, any inter-document links will be re-written (described below). Once the file has been downloaded (5022), the application can open the file from cache (5024).

Figure 6:
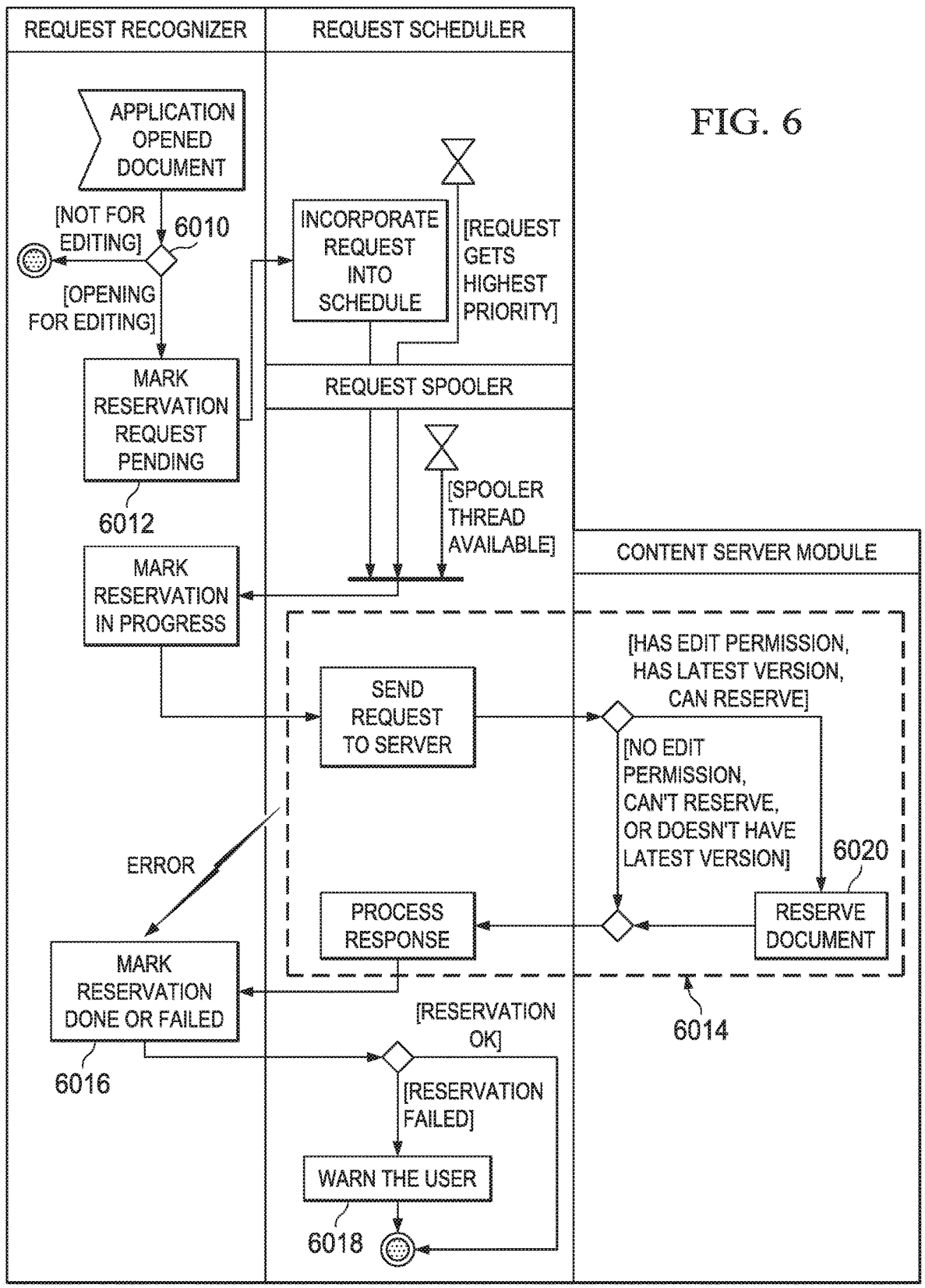

Once the document is open in the application, an attempt will be made to reserve or lock it in content server. FIG. 6 is a state diagram illustrating when the application opens the document. In some cases (e.g., if the file was opened for some reason other than editing, the process ends (6010). Otherwise, the request recognizer will mark a reservation request as pending (6012). The system will determine whether the document can be reserved or locked, and if so, reserve or lock the document (6014). If there is no editing permission, the file can't be reserved or locked, or the content management server doesn't have the latest version, the reservation will be marked as failed (6016), and a warning will be provided to the user (6018). In this case, the document can still be edited, but not reserved or locked. If the document can be reserved or locked, the document will be reserved (locked) (6020), and the reservation will be marked as done (6016).

Figure 7:
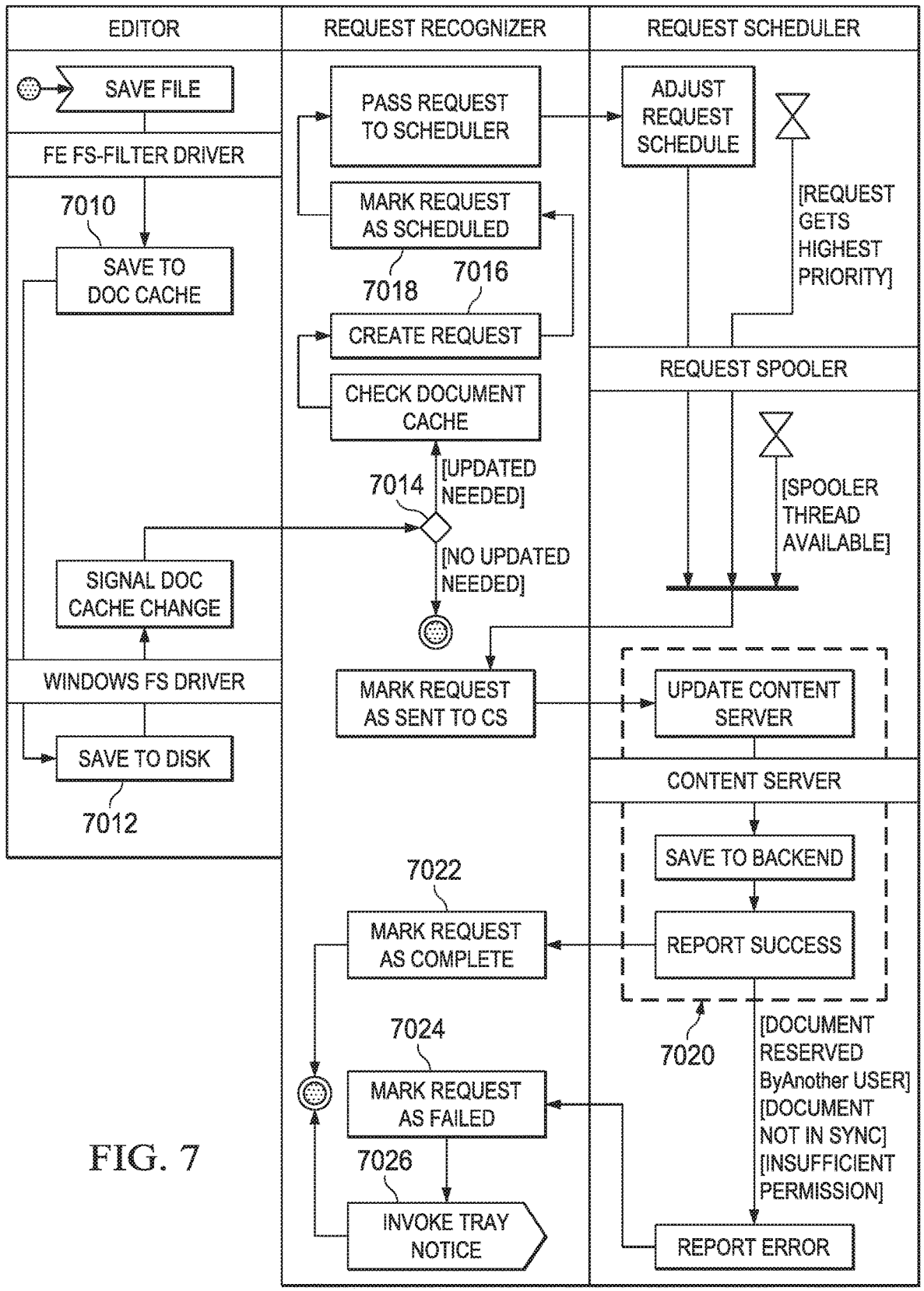

The user may save the document one or more times during the editing session. FIG. 7 is a state diagram illustrating when the document is saved. First, the document is saved to cache (7010) by the cache filter driver (7010) and to disk by the Windows FS driver (7012). The request recognizer determines if an update (i.e., if the content sever file should be overwritten with the edited file) is needed (7014). If an update is needed, a request is created (7016) and scheduled (7018). At the content server, the update request is executed, and the content server is updated (7020). Whether the request is successful (7022) or fails (7024), the request recognizer will invoke a tray notice (7026), informing the user of the status of the update. In the case of a failure, the update may be retried, depending on the reason for failure. Examples of reasons for a failure include a document reservation by another user, a document not in sync, insufficient permissions, etc.

Figure 8:
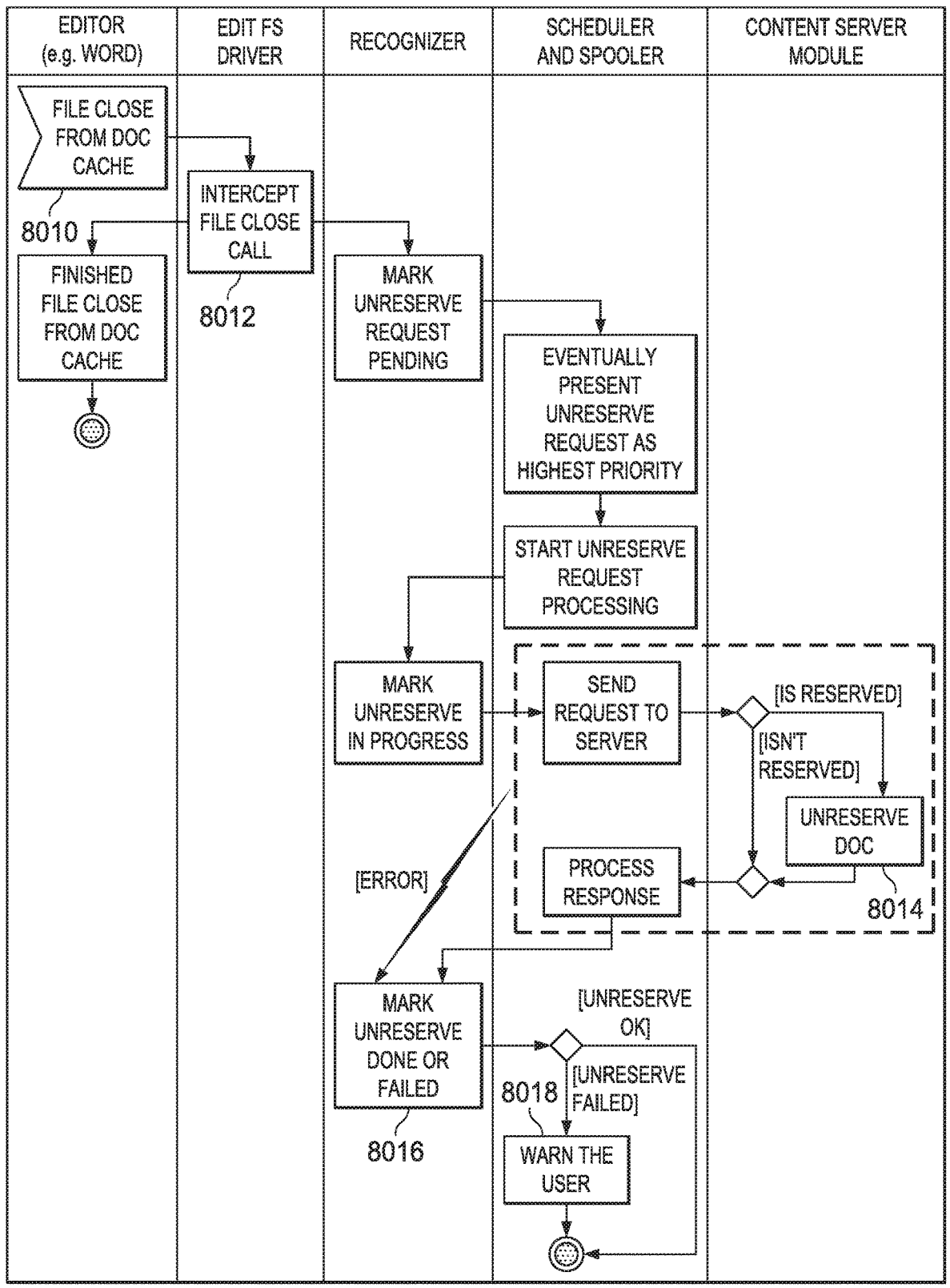

When the application is closed, any reservations on the document will be released in the content management server. FIG. 8 is a state diagram illustrating when the document is saved. When a file is closed (8010), the FS driver will intercept the close call (8012). Eventually, the content management server module will unreserve or unlock the document (8014), assuming that it was reserved (locked). The recognizer will then mark the unreserve or unlock as done or failed (8016), and the user will be warned in the event of a failure (8018).

As mentioned above, the system supports the preservation of inter-document linking (e.g., desktop application inter-document linking) as documents are downloaded to the local cache and uploaded to a content management server. Some documents may include inter-document links, which may include links to other documents. On the content server, global inter-document links may include a URL relating to the storage location on the content management server. Normally, when a document containing a global inter-document link is downloaded, the link will not work if the editing program does not have access to the link address. When a user is editing on a file from cache (as described above), the system can also download linked files. However, the global inter-document links will not work, since the link addresses relate to the content management server addresses, not client device file system locations.

Figure 9:
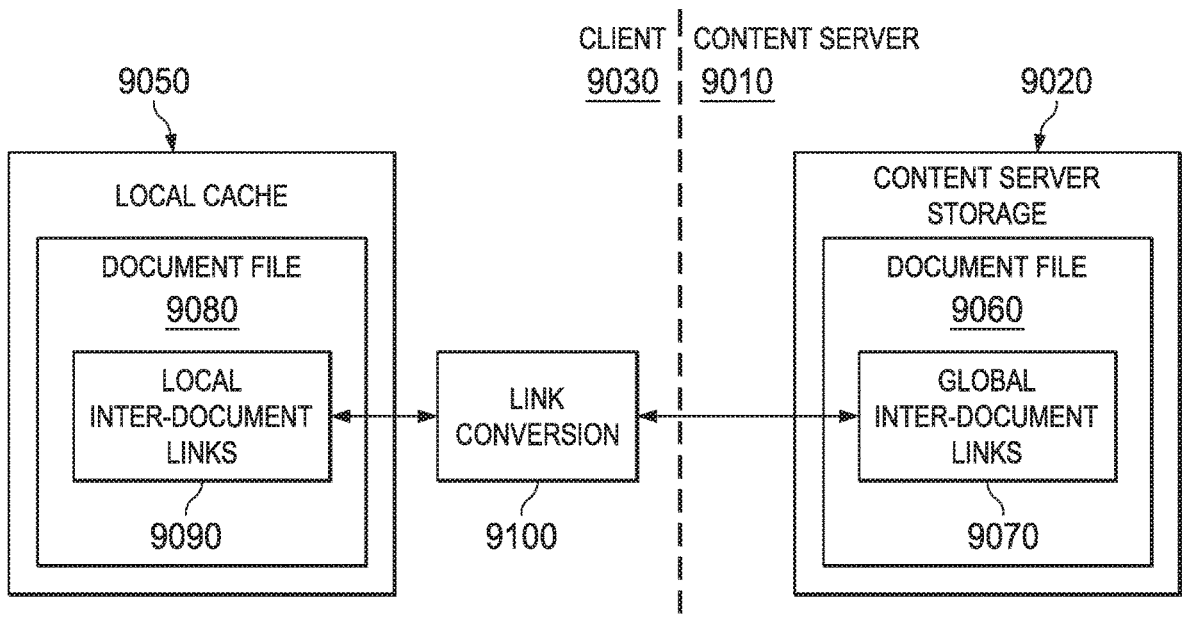
FIG. 9 is a block diagram depicting one embodiment of inter-document link conversion.

FIG. 9 is block diagram illustrating non-limiting embodiments of a system that converts global inter-document links to local inter-document links, and vice versa. FIG. 9 shows a content management server 9010 and client device 9030. A document file 9060 having one or more global inter-document links 9070 is stored in the content server storage 9020. As described above, the inter-document links 9070 are global inter-document links, meaning that they use addresses relating to locations in the content server storage 9020 (in one example, the addresses include a URL). A document file 9080 having one or more global inter-document links 9090 is stored in the client local cache 9050. As described above, the inter-document links 9090 are local inter-document links, meaning that they use addresses relating to locations in the local cache 9050 (in one example, the addresses include a drive letter and folder(s)).

While editing a cached file locally, the global inter-document links may not work, since the addresses in the links are inaccessible. FIG. 9 also shows a link conversion block 9100. When a file having global inter-document links is downloaded from the content management server, the global inter-document links are converted into local inter-document links. If needed, linked documents can also be downloaded to cache. When a file having local inter-document links is uploaded to the content server, the local inter-document links are converted back into global inter-document links.

Figure 10:
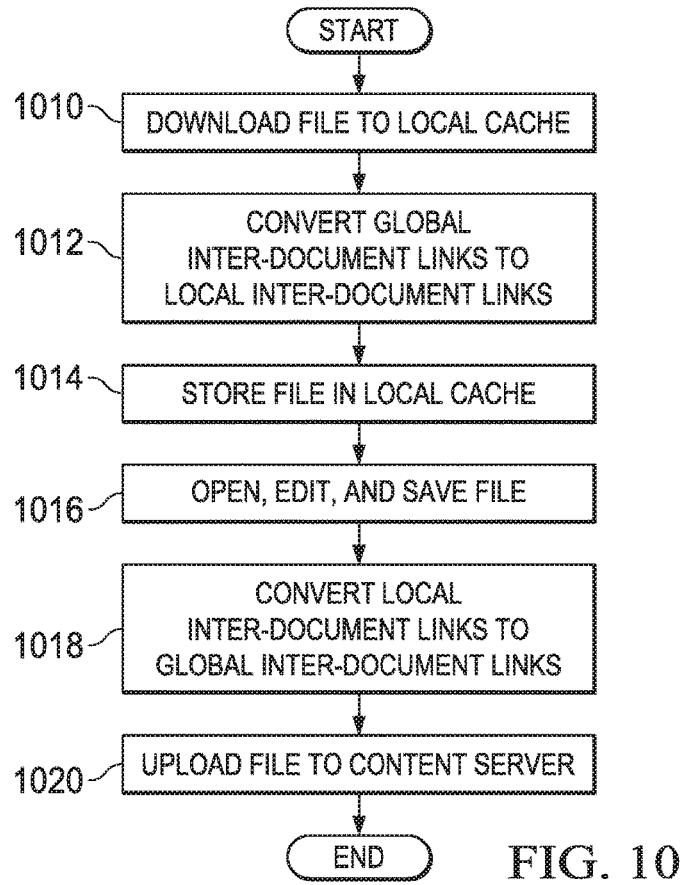
FIG. 10 is a flow chart depicting a process for an embodiment of link conversion.

FIG. 10 is a flow chart depicting non-limiting embodiments of a process for maintaining inter-document links during uploads and downloads. At step 1010, a file is downloaded from a content management server to local cache. If the downloaded file contains global inter-document links, the links are converted to local inter-document links (step 1012). For example, if an inter-document link contains a URL address of a document, the inter-document link is converted to use a local address, such as an address including a drive letter, folder name(s), file name(s), etc. If desired, the linked document can also be downloaded (automatically or manually) so the links will work on the local client. The file, with converted links, is stored in cache (step 1014). At step 1016, the file is opened, edited, saved, etc., as desired. Prior to being uploaded to the content server, the local inter-document links are converted to global inter-document links (step 1018). For example, if a local inter-document link contains a drive letter and folder name(s), the inter-document link is converted to use a global address, such as a URL. After conversion, the file is uploaded to the content server (step 1020).

As mentioned above, in some examples, a user can select files for editing using a content server browser interface. The content server browser interface includes links that allow a user to initiate the local editing of files by clicking on a single link. For example, when a user clicks on a file 'edit' link, the file is automatically reserved or locked (if allowed) and downloaded (if not already downloaded), and opens in a designated application on a client device. When the user saves and/or closes the file, the file is automatically released and synchronized with the content server.

FIG. 11 is a screenshot 1100 depicting an example of a content server browser interface, including a listing of documents with edit links. As shown, a user is presented with a listing of files 1110 available on the content server. In FIG. 11, a file 1112 has been selected by a user. In this example, three menu items 1114 are enabled for the selected file, including 'Edit', 'Open', and 'Download'. With a single click of the respective menu item 1114, the user can initiate editing of the selected file, opening of the selected file, or downloading of the selected file. Once a user initiates editing of the file by clicking on the 'Edit' menu item, a process for locally editing a file from a content server, similar to that described above with respect to FIG. 3, is started.

Figure 12:
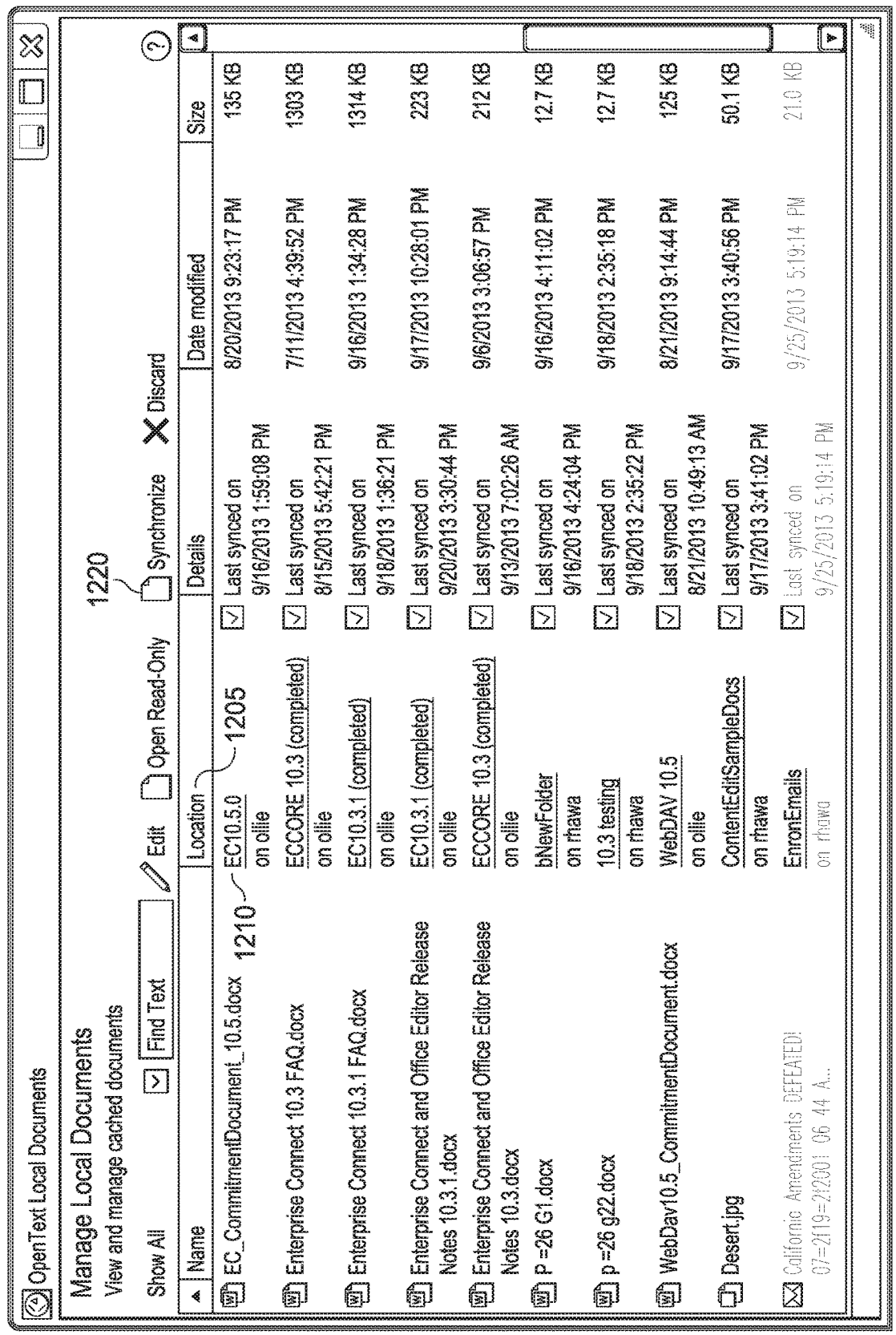
FIG. 12 is a screenshot depicting an example of a manage documents view in a window, including a listing of documents with different folders.

FIG. 12 is a screenshot 1200 depicting an example of a manage documents view in a window, including a listing of documents with different folders as the network's file location 1205 is a folder 1210, similar to that described above with respect to FIG. 3 is started. As shown, a user is presented with a listing of documents or files 1215 available on the cache. The manage documents view has a grid that lists all the documents or files 1215 in the cache: their name, their status. For example, the user can see synced or completed status. It shows the user exactly what stage the user is in. For example, clicking a synchronize button 1220 which will obtain the new version from the content server that the user never had. It will override the changes that user made locally.

Figure 13:
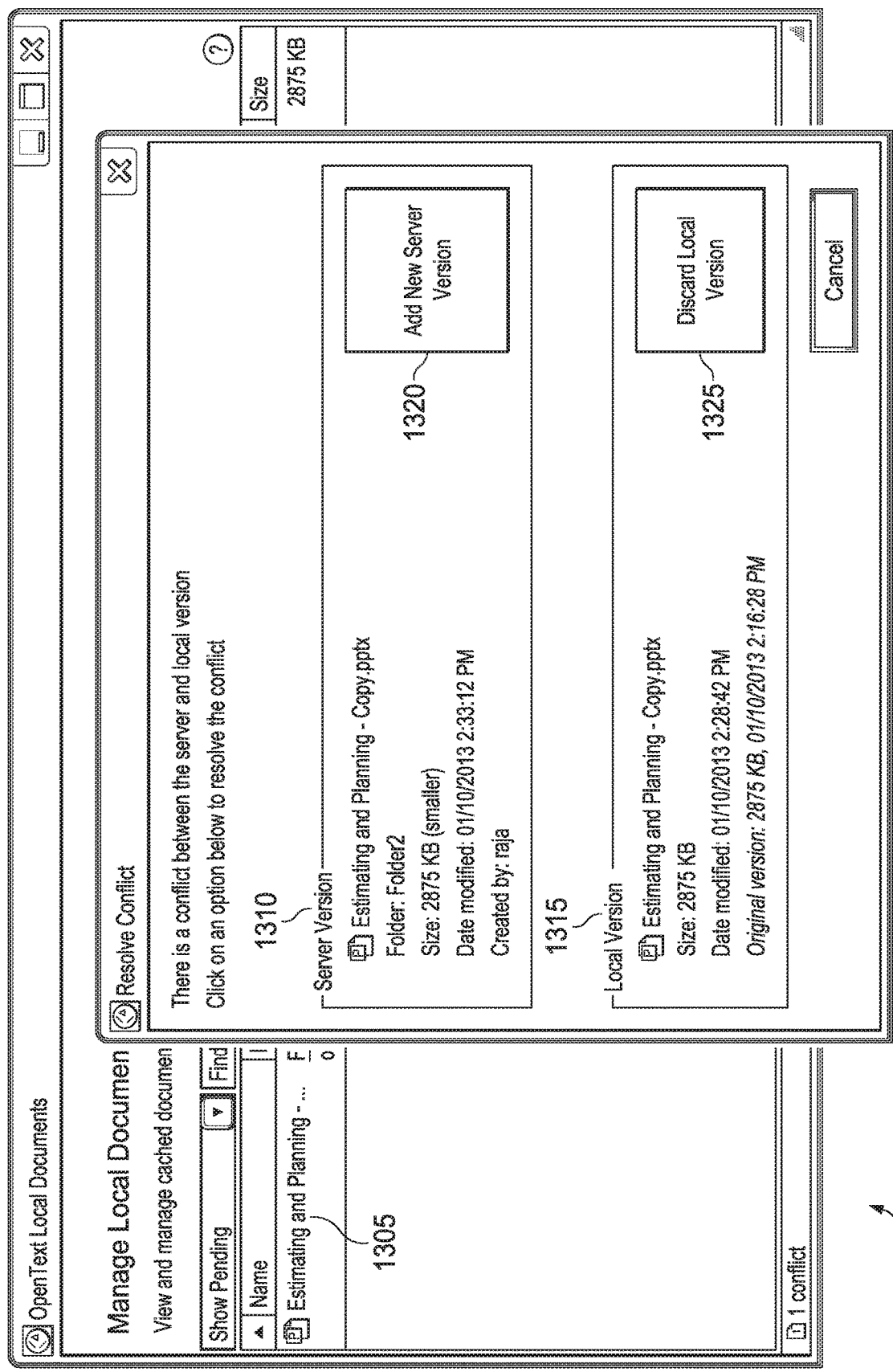
FIG. 13 is a screenshot depicting an example of conflict management when there is a conflict between the content management server and local cache version of a document or a file.

FIG. 13 is a screenshot 1300 depicting an example of conflict management when there is a conflict between the content server and the local cache version of a document or a file 1305. For example, there may be a conflict between a server version 1310 and a local version 1315 of the document "Estimating and Planning—Copy.pptx." To resolve this conflict, a user may be presented with an option as represented by an "Add New Server Version" button 1320 and a "Discard Local Version" button 1325.

A conflict may appear when a user may attempt to edit a document that somebody else has reserved, but because it's reserved, the user won't be able to update it. Such an attempt would result in a conflict, and there are many scenarios, of course, for situations like this. Another case is a first user might be offline, and the first user might edit a document. A second user might go into the content server, unreserve it, edit it, and it would be updated. Then when the first user connects, the first user connected to the Internet will be detected. It will communicate with the content server, and it will indicate the first user that there's a conflict. So then, the first user could decide if the first user is going to overwrite the second user's work. As in an enterprise where there are many employees who have access to the same files, the content server with the provision of the "Add New Server Version" button 1420 and the "Discard Local Version" button 1425 ensures a user inadvertently won't overwrite colleagues' work.

Figure 14:
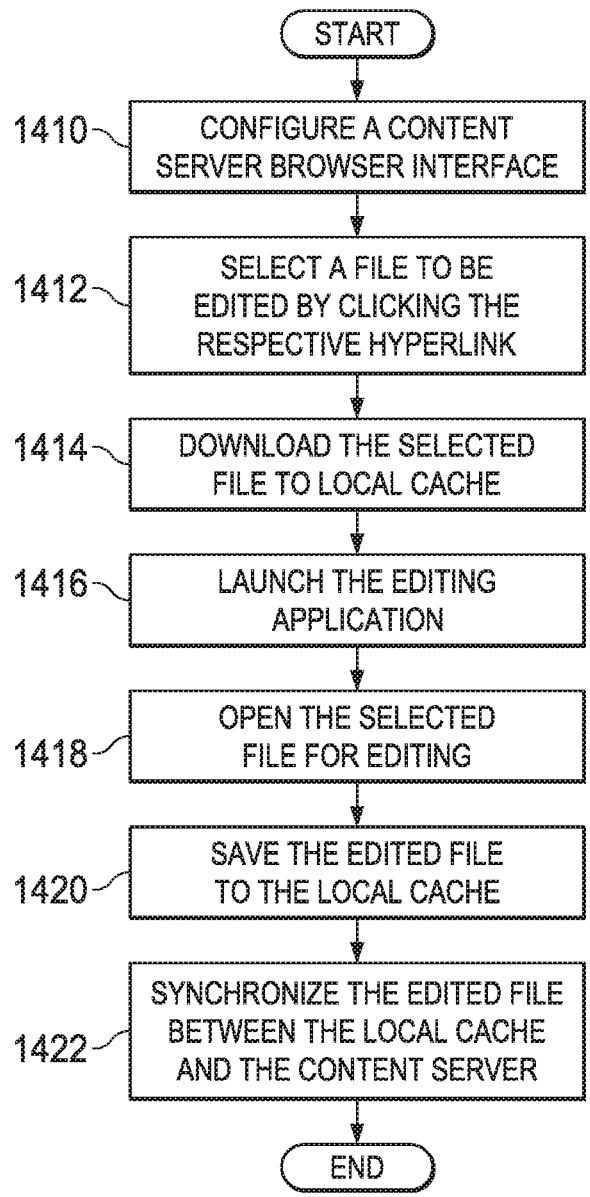
FIG. 14 is a flow diagram depicting one embodiment of a process for enabling a user to select and edit a file from a content management server.

FIG. 14 is a flow chart depicting one embodiment of a process for enabling a user to select and edit a file from a content management server. Steps of such a process may be accomplished in certain embodiments as described above. At step 1410, a content server browser interface is configured. The block diagram shown in FIG. 2 provides one example of a browser interface as a component in an editing system. Other configurations are also possible as shown in FIGS. 12-14. FIG. 11 shows one exemplary screenshot of a browser interface. At step 1412, a user selects a file to be edited by clicking the appropriate hyperlink. In the example screenshot of FIG. 11, if a user wants to edit the selected file 1112, the user simply clicks the 'Edit' link, shown with menu items 1114. As described in detail above, the system downloads the selected file to local cache (step 1414). It is possible that the selected file is already loaded in cache from a previous download. Once the file is downloaded into cache, or it is confirmed that the file is already in cache, the editing application is launched (step 1416). The system can be configured to select the editing application based on any desired rules. For example, the application may be registered in the OS to be the default application for opening a file with a given file extension (e.g., Microsoft Word for a *.docx file, etc.). In other examples, one or more rules may be used to select a desired application based on any number of parameters.

Once the application has launched, the file is opened for editing (step 1418). At step 1420, the file is saved to the local cache. The saved file is then synchronized between the local cache and the content server (step 1422). In this example, the saved file is uploaded to the content server, since the edited file is the most recent version of the file. Note that the system will prevent a second user from saving the file on the content server while the first user is editing the file.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary.

While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in computers communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on to permit a computer to perform any of the steps, operations, methods, routines or portions thereof described herein. The invention may be implemented by using software programming or code by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be source code or object code. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a combination of separate server computers. As one skilled in the art can appreciate, a computer program product implementing an embodiment disclosed herein may comprise one or more non-transitory computer readable media storing computer instructions translatable by processors in a computing environment.

A "processor" includes hardware system, mechanism or component that processes data, signals or other information. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system for editing files stored on a remote content server comprising:
 a sync agent deployed on a client computing device coupled over a network to a content server, wherein the client computing device includes a file system and a local cache in the file system of the client, the sync agent configured to send a request to the content server for a content stored at the content server, receive the content in response to the request, and store the content in the local cache associated with the content server;
 a cache filter disposed between an application deployed on the client computing device and the file system of the client computing device, the cache filter configured to intercept one or more file system requests from the application when the content in the local cache is open in the application, wherein the one or more file system requests include a change request associated with a change to the content in the local cache, the cache filter further configured to inform the sync agent of the change request such that the sync agent makes the change request to the content server to make the change to the content on the content server and the cache filter passes the change request to the file system so that the change can be made on the content in the local cache.

2. The system of claim 1, wherein the content server locks the content at the content server when the content is requested by the sync agent.

3. The system of claim 1, wherein the sync agent is further configured to maintain an identifier for the content; and wherein a new identifier corresponding to the content is returned by the content server in response to the change request and is maintained by the sync agent for the content.

4. The system of claim 3, wherein the new identifier includes both a node identifier and a version number for the content.

5. The system of claim 1, wherein the change request to the content server is made automatically and asynchronously to editing of the content in the local cache through an editor application.

6. The system of claim 1, wherein the sync agent is further configured to convert any local inter-content links contained in the content stored in the local cache to global inter-content links and convert any global inter-content links in the content received from the content server to local inter-content links in the content stored in the local cache.

7. A method for editing files stored on a remote content server comprising:
providing a sync agent deployed on a client computing device coupled over a network to a content server, wherein the client computing device includes a file system and a local cache associated with the content server in the file system of the client, and wherein the sync agent is configured to send a request to the content server for a content stored at the content server, receive the content in response to the request, and store the content in the local cache associated with the content server; and
providing a cache filter disposed between an editor application deployed on the client computing device and the file system of the client computing device, the cache filter configured to intercept file system requests from the editor application when the content in the local cache is open for editing in the editor application, wherein the file system requests include a change request associated with a change to the content in the local cache, the cache filter further configured to inform the sync agent of the change request such that the sync agent makes the change request to the content server to make the change to the content on the content server and the cache filter passes the change request to the file system so that the change can be made on the content in the local cache.

8. The method of claim 7, wherein the content server locks the content at the content server when the content is requested by the sync agent.

9. The method of claim 7, wherein the sync agent is configured to maintain an identifier for the content, and wherein a new identifier corresponding to the content is returned by the content server in response to the change request and is maintained by the sync agent for the content.

10. The method of claim 9, wherein the new identifier includes both a node identifier and a version number for the content.

11. The method of claim 7, wherein the change request to the content server is made automatically and asynchronously to the editing of the content in the local cache through the editor application.

12. The method of claim 7, wherein the sync agent is further configured to convert any local inter-content links contained in the content stored in the local cache to global inter-content links and convert any global inter-content links in the content received from the content server to local inter-content links in the content stored in the local cache.

13. A computer readable medium, including instructions for editing files stored on a remote content server the instructions for providing:
a sync agent deployed on a client computing device coupled over a network to a content server, wherein the client computing device includes a file system and a local cache associated with the content server in the file system of the client, and wherein the sync agent is configured to send a request to the content server for a content stored at the content server, receive the content in response to the request, and store the content in the local cache associated with the content server; and
a cache filter disposed between an editor application deployed on the client computing device and the file system of the client computing device, the cache filter configured to intercept file system requests from the editor application when the content in the local cache is open for editing in the editor application, wherein the file system requests include a change request associated with a change to the content in the local cache, the cache filter further configured to inform the sync agent of the change request such that the sync agent makes the change request to the content server to make the change to the content on the content server and the cache filter passes the change request to the file system so that the change can be made on the content in the local cache.

14. The computer readable medium of claim 13, wherein the content server locks the content at the content server when the content is requested by the sync agent.

15. The computer readable medium of claim 13, wherein the sync agent is configured to maintain an identifier for the content, and wherein a new identifier corresponding to the content is returned by the content server in response to the change request and is maintained by the sync agent for the content.

16. The computer readable medium of claim 15, wherein the new identifier includes both a node identifier and a version number for the content.

17. The computer readable medium of claim 13, wherein the change request to the content server is made automatically and asynchronously to the editing of the content in the local cache through the editor application.

18. The computer readable medium of claim 13, wherein the sync agent is further configured to convert any local inter-content links contained in the content stored in the local cache to global inter-content links and convert any global inter-content links in the content received from the content server to local inter-content links in the content stored in the local cache.

* * * * *